US012205508B2

(12) United States Patent
Tsuchi

(10) Patent No.: US 12,205,508 B2
(45) Date of Patent: Jan. 21, 2025

(54) DIGITAL-TO-ANALOG CONVERTER, DATA DRIVER, AND DISPLAY DEVICE

(71) Applicant: LAPIS Technology Co., Ltd., Yokohama (JP)

(72) Inventor: Hiroshi Tsuchi, Yokohama (JP)

(73) Assignee: LAPIS Technology Co., Ltd., Yokohama (JP)

( * ) Notice: Subject to any disclaimer, the term of this patent is extended or adjusted under 35 U.S.C. 154(b) by 0 days.

(21) Appl. No.: 18/412,628

(22) Filed: Jan. 15, 2024

(65) Prior Publication Data

US 2024/0242651 A1 Jul. 18, 2024

(30) Foreign Application Priority Data

Jan. 18, 2023 (JP) ................................ 2023-005605

(51) Int. Cl.
*G09G 3/20* (2006.01)

(52) U.S. Cl.
CPC ......... *G09G 3/20* (2013.01); *G09G 2310/027* (2013.01); *G09G 2310/0286* (2013.01); *G09G 2310/0289* (2013.01); *G09G 2310/0291* (2013.01)

(58) Field of Classification Search
CPC ............... G09G 3/20; G09G 2310/027; G09G 2310/0286; G09G 2310/0289; G09G 2310/0291
See application file for complete search history.

(56) References Cited

U.S. PATENT DOCUMENTS

| | | | | |
|---|---|---|---|---|
| 8,054,280 B2 * | 11/2011 | Choi | .................... | G09G 3/3685 345/204 |
| 11,341,886 B2 * | 5/2022 | Tsuchi | .................... | H03M 1/68 |
| 11,443,672 B2 * | 9/2022 | Hwang | .................... | G09G 3/20 |
| 2005/0046646 A1 * | 3/2005 | Tobita | .................. | G09G 3/3688 345/690 |
| 2006/0139258 A1 * | 6/2006 | Choi | .................... | G09G 3/3291 345/76 |
| 2006/0152465 A1 * | 7/2006 | Kao | ..................... | G09G 3/3688 345/100 |

(Continued)

FOREIGN PATENT DOCUMENTS

| | | | |
|---|---|---|---|
| JP | 2002043944 | 2/2002 | |
| WO | WO-2012127956 A1 * | 9/2012 | ......... H03F 3/45183 |

*Primary Examiner* — Amy Onyekaba
(74) *Attorney, Agent, or Firm* — JCIPRNET

(57) ABSTRACT

The disclosure includes: a decoder generating multiple input voltages each having one or the other of two reference voltages selected from multiple reference voltages, using a high voltage digital data signal obtained by increasing the amplitude of a low voltage digital data signal; and a differential amplifier including multiple differential pairs and receiving the input voltages at the non-inverting input terminals of the differential pairs and receiving an output voltage signal at the inverting input terminals to generate an output voltage signal having one of the voltage levels obtained by dividing the two reference voltages into a power of 2. The differential amplifier includes: multiple current sources generating tail currents flowing through the tails of the differential pairs; and multiple clamp transistors provided respectively between the tails of the differential pairs and the current sources and holding a voltage applied to each current source at or below a low voltage.

11 Claims, 15 Drawing Sheets

(56) References Cited

U.S. PATENT DOCUMENTS

2006/0232520 A1* 10/2006 Park .................... G09G 3/3291 345/76
2006/0250289 A1* 11/2006 Tsuchi .................. H03M 1/662 341/144
2007/0146042 A1* 6/2007 Tsuchi ............... H03K 3/35613 327/333
2008/0111628 A1* 5/2008 Tsuchi ................. G09G 3/3688 345/87
2008/0174462 A1* 7/2008 Tsuchi ................. G09G 3/3614 327/108
2009/0213051 A1* 8/2009 Tsuchi ................. G09G 3/3685 345/87
2009/0231319 A1* 9/2009 Tsuchi ................ H03F 3/45183 330/253
2010/0141493 A1* 6/2010 Cho ...................... H03M 1/664 341/145
2010/0271348 A1* 10/2010 Tsuchi ................. G09G 3/3291 345/205
2011/0007057 A1* 1/2011 Fukuo .................. G09G 3/3614 345/87
2011/0080214 A1* 4/2011 Tsuchi ................. G09G 3/3688 330/69
2011/0205193 A1* 8/2011 Nishimura .......... H03F 3/45183 330/253
2013/0016087 A1* 1/2013 Kishikawa ............ H03F 3/3022 345/212
2013/0076722 A1* 3/2013 Choi ...................... G09G 3/348 345/212
2017/0154568 A1* 6/2017 Tsuchi ........... H03K 19/018521
2020/0013320 A1* 1/2020 Yamamoto ............... G09G 3/32
2020/0294437 A1* 9/2020 Tsuchi ..................... G09G 3/20

* cited by examiner

K=2

| Digital data DT | | | | | |
|---|---|---|---|---|---|
| D1 | | 0 | 0 | 1 | 1 |
| D0 | | 0 | 1 | 0 | 1 |
| Non-inverting input terminal supply voltage(Vgx, Vgy) | | | | | |
| V1 | 0 | 4 | 4 | 4 | 4 |
| V2 | 0 | 0 | 4 | 4 | 4 |
| V3 | 0 | 0 | 0 | 4 | 4 |
| V4 | 0 | 0 | 0 | 0 | 4 |
| Output voltage level | | | | | |
| Vout | 0 | 1 | 2 | 3 | 4 |

Vout=(V1+V2+V3+V4)/4

Vgx=0, Vgy=4

FIG. 2A

K=2

| Digital data DT | | | | | |
|---|---|---|---|---|---|
| D1 | 0 | 0 | 1 | 1 | |
| D0 | 0 | 1 | 0 | 1 | |
| Non-inverting input terminal supply voltage(Vgx, Vgy) | | | | | |
| V1 | 0 | 4 | 4 | 4 | 4 |
| V2 | 0 | 0 | 4 | 4 | 4 |
| V3 | 0 | 0 | 0 | 4 | 4 |
| V4 | 0 | 0 | 0 | 0 | 4 |
| Output voltage level | | | | | |
| Vout | 0 | 1 | 2 | 3 | 4 |

Vout=(V1+V2+V3+V4)/4

Vgx=0, Vgy=4

FIG. 2B

K=2

| Digital data DT | | | | | |
|---|---|---|---|---|---|
| D1 | | 0 | 0 | 1 | 1 |
| D0 | | 0 | 1 | 0 | 1 |
| Non-inverting input terminal supply voltage(Vgx, Vgy) | | | | | |
| V1 | 0 | 4 | 4 | 4 | 4 |
| V2 | 0 | 0 | 4 | 0 | 4 |
| V3 | 0 | 0 | 0 | 4 | 4 |
| V4 | 0 | 0 | 0 | 4 | 4 |
| Output voltage level | | | | | |
| Vout | 0 | 1 | 2 | 3 | 4 |

Vout=(V1+V2+V3+V4)/4

Vgx=0, Vgy=4

FIG. 2C

K=3

| Digital data DT | | | | | | | | | |
|---|---|---|---|---|---|---|---|---|---|
| D2 | | 0 | 0 | 0 | 0 | 1 | 1 | 1 | 1 |
| D1 | | 0 | 0 | 1 | 1 | 0 | 0 | 1 | 1 |
| D0 | | 0 | 1 | 0 | 1 | 0 | 1 | 0 | 1 |
| Non-inverting input terminal supply voltage(Vgx, Vgy) | | | | | | | | | |
| V1 | 0 | 8 | 8 | 8 | 8 | 8 | 8 | 8 | 8 |
| V2 | 0 | 0 | 8 | 0 | 8 | 0 | 8 | 0 | 8 |
| V3 | 0 | 0 | 0 | 8 | 8 | 0 | 0 | 8 | 8 |
| V4 | 0 | 0 | 0 | 8 | 8 | 0 | 0 | 8 | 8 |
| V5 | 0 | 0 | 0 | 0 | 0 | 8 | 8 | 8 | 8 |
| V6 | 0 | 0 | 0 | 0 | 0 | 8 | 8 | 8 | 8 |
| V7 | 0 | 0 | 0 | 0 | 0 | 8 | 8 | 8 | 8 |
| V8 | 0 | 0 | 0 | 0 | 0 | 8 | 8 | 8 | 8 |
| Output voltage level | | | | | | | | | |
| Vout | 0 | 1 | 2 | 3 | 4 | 5 | 6 | 7 | 8 |

Vout=(V1+V2+V3+V4+V5+V6+V7+V8)/8
Vgx=0, Vgy=8

FIG. 3

K=1, M=2

| Digital data DT | | | | | |
|---|---|---|---|---|---|
| D1 | | 0 | 0 | 1 | 1 |
| D0 | | 0 | 1 | 0 | 1 |
| Non-inverting input terminal supply voltage(Vgx, Vgy) | | | | | |
| V1 | 0 | 4 | 4 | 4 | 4 |
| V2 | 0 | 0 | 0 | 0 | 4 |
| Current ratio | | | | | |
| m1 | 1 | 0.5 | 1 | 1.5 | 1 |
| m2 | 1 | 1.5 | 1 | 0.5 | 1 |
| Output voltage level | | | | | |
| Vout | 0 | 1 | 2 | 3 | 4 |

$$Vout=(m1\cdot V1+m2\cdot V2)/(m1+m2)$$

$Vgx=0$, $Vgy=4$

FIG. 5

K=1, M=3

| Digital data DT | | | | | | | | | |
|---|---|---|---|---|---|---|---|---|---|
| D2 | | 0 | 0 | 0 | 0 | 1 | 1 | 1 | 1 |
| D1 | | 0 | 0 | 1 | 1 | 0 | 0 | 1 | 1 |
| D0 | | 0 | 1 | 0 | 1 | 0 | 1 | 0 | 1 |
| **Non-inverting input terminal supply voltage(Vgx, Vgy)** | | | | | | | | | |
| V1 | 0 | 8 | 8 | 8 | 8 | 8 | 8 | 8 | 8 |
| V2 | 0 | 0 | 0 | 0 | 0 | 0 | 0 | 0 | 8 |
| **Tail current ratio** | | | | | | | | | |
| m1 | 1 | 0.25 | 0.5 | 0.75 | 1 | 1.25 | 1.5 | 1.75 | 1 |
| m2 | 1 | 1.75 | 1.5 | 1.25 | 1 | 0.75 | 0.5 | 0.25 | 1 |
| **Output voltage level** | | | | | | | | | |
| Vout | 0 | 1 | 2 | 3 | 4 | 5 | 6 | 7 | 8 |

$Vout=(m1 \cdot V1+m2 \cdot V2)/(m1+m2)$ $Vgx=0$, $Vgy=8$

FIG. 7

K=2, M=3

| | | | | | | | | | |
|---|---|---|---|---|---|---|---|---|---|
| Digital data DT | | | | | | | | | |
| D2 | | 0 | 0 | 0 | 0 | 0 | 0 | 0 | 1 |
| D1 | | 0 | 0 | 0 | 1 | 1 | 1 | 1 | 1 |
| D0 | | 0 | 1 | 1 | 0 | 0 | 1 | 1 | 1 |
| Non-inverting input terminal supply voltage(Vgx, Vgy) | | | | | | | | | |
| V1 | 0 | 8 | 8 | 8 | 8 | 8 | 8 | 8 | 8 |
| V2 | 0 | 0 | 0 | 0 | 8 | 0 | 0 | 0 | 8 |
| V3 | 0 | 0 | 0 | 0 | 0 | 8 | 8 | 8 | 8 |
| V4 | 0 | 0 | 0 | 0 | 0 | 8 | 8 | 8 | 8 |
| Tail current ratio | | | | | | | | | |
| m1 | 1 | 0.5 | 1 | 1.5 | 1 | 0.5 | 1 | 1.5 | 1 |
| m2 | 1 | 1.5 | 1 | 0.5 | 1 | 1.5 | 1 | 0.5 | 1 |
| m3 | 1 | 1 | 1 | 1 | 1 | 1 | 1 | 1 | 1 |
| m4 | 1 | 1 | 1 | 1 | 1 | 1 | 1 | 1 | 1 |
| Output voltage level | | | | | | | | | |
| Vout | 0 | 1 | 2 | 3 | 4 | 5 | 6 | 7 | 8 |

FIG. 10

DIGITAL-TO-ANALOG CONVERTER, DATA DRIVER, AND DISPLAY DEVICE

CROSS-REFERENCE TO RELATED APPLICATION

This application claims the priority benefits of Japanese application no. 2023-005605, filed on Jan. 18, 2023. The entirety of the above-mentioned patent application is hereby incorporated by reference herein and made a part of this specification.

BACKGROUND

Technical Field

The disclosure relates to a digital-to-analog converter, a data driver including the digital-to-analog converter, and a display device including the data driver.

Description of Related Art

Currently, liquid crystal display devices or organic EL (Electroluminescence) display devices, etc. are the mainstream active matrix display devices. Such a display device is equipped with a display panel in which multiple data lines and multiple scanning lines are wired in an intersecting manner and display cells connected to the multiple data lines via pixel switches are arranged in a matrix, a data driver which supplies an analog voltage signal corresponding to the gradation level to the multiple data lines of the display panel, and a scanning driver which supplies a scanning signal for controlling on/off of each pixel switch to the multiple scanning lines of the display panel. The data driver includes a digital-to-analog converter that converts a video digital signal into an analog voltage corresponding to the brightness level and supplies an amplified voltage signal to each data line of the display panel.

A schematic configuration of the data driver will be described hereinafter.

The data driver includes, for example, a shift register, a data register latch, a level shifter, and the digital-to-analog converter.

The shift register generates multiple latch timing signals for selecting a latch in synchronization with a clock signal corresponding to a start pulse supplied from a display controller, and supplies the same to the data register latch. The data register latch captures the video digital data supplied from the display controller every predetermined S pieces (S is an integer of 2 or more) based on each of the latch timing signals supplied from the shift register, and supplies S video digital data signals to the level shifter. The level shifter performs level shifting processing to increase the signal amplitude for each of the S video digital data signals supplied from the data register latch, and supplies the obtained S level-shifted video digital data signals to the digital-to-analog converter.

The digital-to-analog converter includes a reference voltage group generation part, a decoder part, and an amplification part.

The reference voltage group generation part generates multiple reference voltages with voltage values different from each other and supplies the same to the decoder part. For example, the reference voltage group generation part supplies to the decoder part multiple divided voltages, obtained by dividing between at least two reference power supply voltages with a ladder resistor, as a reference voltage group.

The decoder part has S decoders provided respectively corresponding to each output of the data driver. Each of the decoders is supplied with the reference voltage group generated by the reference voltage group generation part, and receives the video digital data signal supplied from the level shifter, selects the reference voltage corresponding to this video digital data signal from the multiple reference voltages, and supplies the selected reference voltage to the amplification part.

The amplification part includes S differential amplifiers that individually amplify and output the reference voltage selected by each decoder of the decoder part.

With the above-described digital-to-analog converter, it is possible to increase the number of gradations (number of colors) of the brightness level that can be expressed as the number of reference voltages generated by the reference voltage group generation part increases.

However, when the number of reference voltages generated by the reference voltage group generation part increases, the wiring area and the number of switch elements included in the decoder that selects the reference voltage also increase accordingly, and the chip size (manufacturing cost) of the data driver increases.

Therefore, a digital-to-analog converter has been proposed (see, for example, Patent Document 1 (Japanese Patent Application Laid-Open No. 2002-43944)), which uses a differential amplifier that is capable of outputting three or more voltage values by dividing (interpolating) two reference voltages selected based on the brightness level with a predetermined weighting, as the differential amplifier described above.

Patent Document 1 proposes a negative feedback differential amplifier that outputs an output voltage with one of four voltage values obtained by dividing two reference voltages into four, and a digital-to-analog converter using this. Such a differential amplifier has four equivalent differential pairs whose output voltages are commonly fed back to the respective inverting input terminals and whose non-inverting input terminals are commonly connected in a 1:1:2 manner. In the differential amplifier, the above two reference voltages may be selectively input to the non-inverting input terminal of each differential pair according to the lower 2 bits of data of the digital data signal to be subjected to digital-to-analog conversion, so as to selectively output four analog voltage levels that divide the two reference voltages. The digital-to-analog converter including the differential amplifier is capable of selecting two adjacent reference voltages from the reference voltage group every fourth gradation based on the upper bits of data of the digital data signal, and thereby outputting a voltage level four times (F-1) with respect to the number of voltages F (F is an integer of 2 or more) of the reference voltage group from the differential amplifier.

It should be noted that the digital-to-analog converter is expandable and includes, for example, a differential amplifier that is capable of selectively inputting two reference voltages to the non-inverting input terminal of each differential pair to output eight voltage levels dividing the two reference voltages based on the lower 3 bits of data of the digital data signal using eight equivalent differential pairs. As a result, the digital-to-analog converter is capable of outputting a voltage level eight times (F-1) with respect to the number of voltages F of the input reference voltage group according to the digital data.

High-end display devices that involve high-definition images, such as display devices used in medical and professional applications, are required to display multiple gradations of, for example, 10 to 12 bits. In addition, in terms of organic EL display devices, the gamma curve is different for each RGB. Thus, in the case of making a common gamma configuration for RGB, in order to correspond to the gamma curve for each color, it is necessary to provide gradations corresponding to at least 10 bits or more of digital data.

For example, the number of gradations expressed by a digital-to-analog converter that supports 10-bit digital data is 1024 gradations, and every time the number of bits of the digital data increases by 1 bit, the number of gradations increases by twice. Thus, in the digital-to-analog converter, the circuit scale (area) increases by multiples every time the number of bits of the digital data increases by 1 bit, so a digital-to-analog converter that supports multi-bit digital data of 10 bits or more has a significant increase in area.

However, even if the technology of Patent Document 1 is applied as a digital-to-analog converter to save area, the number of voltage levels (hereinafter referred to as the number of divided voltage levels) for dividing two reference voltages still needs to be increased.

For example, although the digital-to-analog converter of Patent Document 1 may increase the number of divided voltage levels to 4, 8, 16, and so on, the differential amplifier used requires the same number of differential pairs as the number of divided voltage levels.

Thus, if the number of divided voltage levels is significantly increased (for example, from 8 to 16), while the area of the decoder that constitutes the digital-to-analog converter is reduced, the area of the differential amplifier itself increases significantly.

Therefore, the disclosure provides a digital-to-analog converter that is capable of saving area even when the number of divided voltage levels is large, a data driver including the digital-to-analog converter, and a display device.

SUMMARY

A digital-to-analog converter according to the disclosure is a digital-to-analog converter configured to convert a low voltage digital data signal with a low voltage into a high voltage analog output voltage signal with a high voltage. The digital-to-analog converter includes: a reference voltage generation part configured to generate a plurality of reference voltages different from each other; a level shifter configured to receive the low voltage digital data signal, and convert the low voltage digital data signal into a high voltage digital data signal with an increased signal amplitude; a decoder configured to select two reference voltages with different voltage values from the plurality of reference voltages based on the high voltage digital data signal, and generate a plurality of input voltages each having one or the other of the two reference voltages; and a differential amplifier including a plurality of differential pairs connected in parallel, and configured to receive the plurality of input voltages at respective non-inverting input terminals of the plurality of differential pairs and receive the output voltage signal at respective inverting input terminals of the plurality of differential pairs to generate the output voltage signal having one of voltage levels obtained by dividing the two reference voltages into a power of 2. The differential amplifier includes: a plurality of current sources configured to generate tail currents flowing through respective tails of the plurality of differential pairs; and a plurality of clamp transistors provided respectively between the respective tails of the plurality of differential pairs and the plurality of current sources, and configured to hold a voltage applied to each of the plurality of current sources at a voltage lower than the high voltage.

A data driver according to the disclosure includes: a plurality of the digital-to-analog converters described above, and the data driver is configured to receive each of video digital data signals, which represent a brightness level of each pixel as a digital value, as the low voltage digital data signal; convert each of the video digital data signals into a plurality of the output voltage signals each having an analog voltage value by the plurality of digital-to-analog converters; and supply the output voltage signals to a plurality of data lines of a display panel.

A display device according to the disclosure includes: a display panel including a plurality of data lines respectively connected to a plurality of display cells; and a data driver configured to receive each of video digital data signals, which represent a brightness level of each pixel as a digital value, as the low voltage digital data signal, convert each of the video digital data signals into a plurality of the output voltage signals each having an analog voltage value by each of the digital-to-analog converters described above, and supply the output voltage signals to the plurality of data lines of the display panel.

In the disclosure, a digital-to-analog converter configured to convert a low voltage digital data signal into a high voltage analog output voltage signal includes the following level shifter, decoder, and differential amplifier.

That is, the level shifter increases the amplitude of a low voltage digital data signal to convert the low voltage digital data signal into a high voltage digital data signal. The decoder selects two reference voltages from a plurality of reference voltages based on the high voltage digital data signal, generates a plurality of input voltages each having one or the other of the two selected reference voltages, and supplies the input voltages to the differential amplifier. The differential amplifier includes a plurality of differential pairs connected in parallel, and receives the plurality of input voltages described above at the non-inverting input terminals of the differential pairs and receives an output voltage signal at the inverting input terminals of the differential pairs to generate an output voltage signal having one of the voltage levels obtained by dividing the two reference voltages into a power of 2.

Here, such a differential amplifier includes a plurality of current sources that generate tail currents to flow through the tails of the plurality of differential pairs described above, and a plurality of clamp transistors provided respectively between the plurality of current sources and the plurality of differential pairs to hold the voltage applied to each of the plurality of current sources at or below a low voltage. Although the clamp transistor is configured with a high voltage element, unlike a transistor that controls a current source or the like, high accuracy is not required, so the clamp transistor may be configured with, for example, the minimum size of a high voltage element.

Furthermore, since each current source may be configured with a low voltage circuit, the area of the digital-to-analog converter may be saved even if the number of divided voltage levels increases due to an increase in the number of differential pairs. Besides, by using such a digital-to-analog converter as the amplifier for each of multiple output stages in a data driver that drives a display panel, it is possible to save area of the data driver itself. At this time, the current source that generates a tail current to flow through the differential pair included in each of the amplifiers may be configured with a low voltage circuit (including low voltage transistor) that generally has smaller manufacturing variations than a high voltage circuit and may be increased in density, so it becomes possible to achieve higher accuracy and save area.

BRIEF DESCRIPTION OF THE DRAWINGS

FIG. 2A is a diagram showing an example of the first specification of the digital-to-analog converter 100.

FIG. 2B is a diagram showing another example of the first specification of the digital-to-analog converter 100.

FIG. 2C is a diagram showing yet another example of the first specification of the digital-to-analog converter 100.

FIG. 3 is a diagram showing an example of the second specification of the digital-to-analog converter 100.

FIG. 5 is a diagram showing an example of the first specification of the digital-to-analog converter 200.

FIG. 7 is a diagram showing an example of the second specification of the digital-to-analog converter 200.

FIG. 10 is a diagram showing an example of the first specification of the digital-to-analog converter 300.

DESCRIPTION OF THE EMBODIMENTS

Embodiments of the disclosure will be described in detail hereinafter.

First Embodiment

Figure 1:
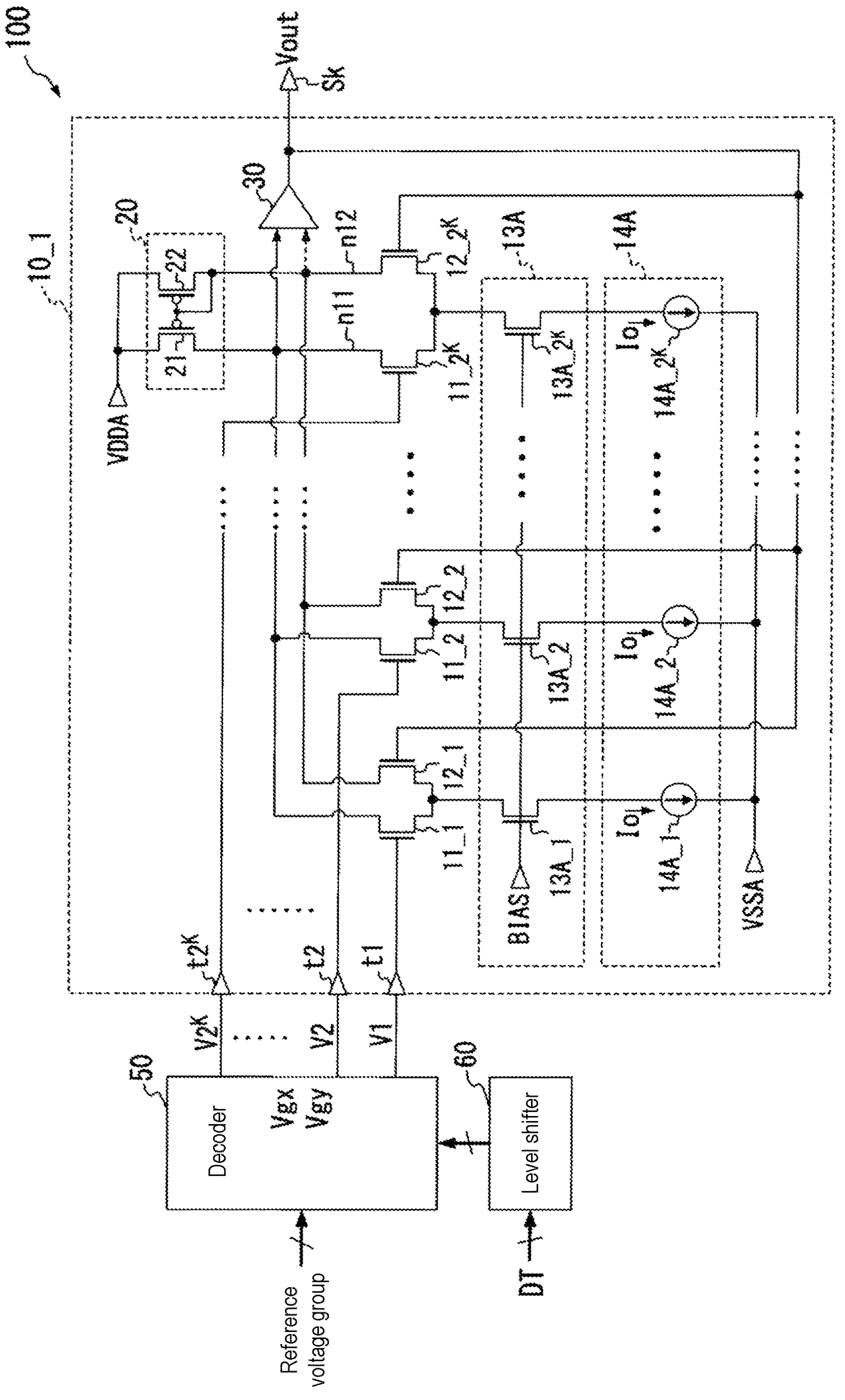
FIG. 1 is a circuit diagram showing the configuration of the digital-to-analog converter 100 according to the first embodiment of the disclosure.

FIG. 1 is a circuit diagram showing the configuration of a digital-to-analog converter 100 according to the first embodiment of the disclosure.

The digital-to-analog converter 100 receives a low voltage N-bit (N is a positive number of 3 or more) digital data signal DT that is to be converted, converts the digital data signal DT into an output voltage signal Vout having a high voltage analog voltage value, and outputs the output voltage signal Vout.

The digital-to-analog converter 100 includes a decoder 50, a level shifter 60, and a differential amplifier 10_1.

The level shifter 60 generates a high voltage N-bit digital data signal which is level-shifted in a direction that increases the amplitude of the signal level of the digital data signal DT, and supplies the digital data signal to the decoder 50.

The decoder 50 receives such a high voltage digital data signal as well as a reference voltage group. It should be noted that the reference voltage group includes a plurality of voltages each having a maximum voltage value corresponding to the maximum value that can be expressed by the digital data signal DT, a minimum voltage value corresponding to the minimum value, and a plurality of intermediate voltage values between the maximum voltage value and the minimum voltage value.

The decoder 50 selects two reference voltages having different voltage values from the reference voltage group as the reference voltages Vgx and Vgy, based on the high voltage digital data signal. Next, the decoder 50 distributes the selected two reference voltages Vgx and Vgy to the non-inverting input terminals t1 to t$2^K$ (K is an integer greater than or equal to 1 and less than N) of the differential amplifier 10_1, and thereby generates the input voltages V1 to V$2^K$ to be input to the non-inverting input terminals t1 to t$2^K$. That is, the decoder 50 supplies the input voltages V1 to V$2^K$ each having one of the reference voltages Vgx and Vgy to the non-inverting input terminals t1 to t$2^K$ of the differential amplifier 10_1.

Based on the input voltages V1 to V$2^K$ each having one of the reference voltages Vgx and Vgy, the differential amplifier 10_1 outputs one of the voltage levels obtained by dividing the voltage between the reference voltages Vgx and Vgy into a power of 2 as the output voltage signal Vout.

The differential amplifier 10_1 includes $2^K$ differential pairs (11_1, 12_1) to (11_$2^K$, 12_$2^K$) of the same conductivity type (N-channel type in FIG. 1), each of which is supplied with a tail current and whose output pairs are commonly connected to each other, a breakdown voltage protection circuit 13A, a tail current control circuit 14A, a current mirror circuit 20, and an amplification stage 30. Here, it is assumed that the $2^K$ differential pairs are configured with equivalent differential pairs in which transistors forming each pair have the same characteristics. It is assumed that the disclosure also includes an equivalent modification that, in the $2^K$ differential pairs, a plurality of transistors whose terminals receive a common signal are aggregated and the transistor size is changed to reduce the number of differential pairs. However, for convenience of explanation, the differential amplifier of each embodiment will be described based on a configuration that has a power of two equivalent differential pairs.

The current mirror circuit 20 includes P-channel type transistors 21 and 22 whose gates are commonly connected and whose sources are commonly connected. The high potential power supply voltage VDDA is applied to the source of each of the transistors 21 and 22. Further, the drain of the transistor 21 is connected to the node n11, and the gate and drain of the transistor 22 are connected to the node n12. Further, the nodes n11 and n12 are respectively connected to the commonly connected output pairs of the $2^K$ differential pairs. With such a configuration, the current mirror circuit 20 functions as a common load for the $2^K$ differential pairs.

The amplification stage 30 receives the output signal from one or both of the commonly connected output pairs (nodes n11, n12) of the $2^K$ differential pairs to produce an amplification effect, and outputs the voltage generated by the amplification effect as the output voltage signal Vout via the output terminal Sk.

The output voltage signal Vout is fed back to the inverting input terminal of each of the differential pairs (11_1, 12_1) to (11_$2^K$, 12_$2^K$), that is, the gate of each of the N-channel type transistors (hereinafter also referred to as differential pair transistors) 12_1 to 12_2$^K$.

The voltage (Vgx or Vgy) received at the non-inverting input terminals t1 to t2$^K$ is supplied to the non-inverting input terminal of each of the differential pairs (11_1, 12_1) to (11_2$^K$, 12_2$^K$), that is, the gate of each of the N-channel type transistors (hereinafter also referred to as differential pair transistors) 11_1 to 11_2$^K$. In each of the differential pairs (11_1, 12_1) to (11_2$^K$, 12_2$^K$), the sources of the transistors forming a pair are connected to each other. In addition, the transistors 11_1 to 11_2$^K$ have the same transistor characteristics, and the respective drains are commonly connected through the node n11. The transistors 12_1 to 12_2$^K$ have the same transistor characteristics, and the respective drains are commonly connected through the node n12. That is, the $2^K$ differential pairs (11_1, 12_1) to (11_2$^K$, 12_2$^K$) have a parallel connection configuration in which the output pairs are commonly connected.

The breakdown voltage protection circuit 13A includes N-channel type transistors (hereinafter also referred to as clamp transistors) 13A_1 to 13A_2$^K$ provided respectively corresponding to the differential pairs (11_1, 12_1) to (11_2$^K$, 12_2$^K$). The drains of the clamp transistors 13A_1 to 13A_2$^K$ are respectively connected to the sources of the corresponding differential pairs among the differential pairs (11_1, 12_1) to (11_2$^K$, 12_2$^K$). Further, the bias voltage BIAS having a predetermined voltage value is supplied to the gate of each of the clamp transistors 13A_1 to 13A_2$^K$.

The tail current control circuit 14A includes a plurality of current sources (hereinafter also referred to as current source transistors) 14A_1 to 14A_2$^K$ configured with transistors. The drain of each of the current source transistors 14A_1 to 14A_2$^K$ is connected to the source of each of the clamp transistors 13A_1 to 13A_2$^K$. Further, the reference power supply voltage VSSA (for example, 0 V) is applied to the source of each of the current source transistors 14A_1 to 14A_2$^K$, and a low bias voltage is supplied to each gate. This low bias voltage has a voltage value less than the low potential power supply voltage VDDD, which will be described later. With such a configuration, the clamp transistors 13A_1 to 13A_2$^K$ cause the reference current Io having a constant current value to flow as a tail current to each of the differential pairs (11_1, 12_1) to (11_2$^K$, 12_2$^K$).

Here, each of the transistors 21 and 22 of the current mirror circuit 20, the differential pair transistors 11_1 to 11_2$^K$ and 12_1 to 12_2$^K$, and the clamp transistors 13A_1 to 13A_2$^K$ described above is configured with a high voltage transistor with a high breakdown voltage that operates at the high potential power supply voltage VDDA (for example, 8 V). The element breakdown voltage of such a high voltage transistor is determined by adding a predetermined voltage margin (for example, about +10% to +20%) to the high potential power supply voltage VDDA.

On the other hand, each of the current source transistors 14A_1 to 14A_2$^K$ is configured with a low voltage transistor with a low breakdown voltage that operates at a low potential power supply voltage VDDD (for example, 1.5 V) lower than the high potential power supply voltage VDDA. The element breakdown voltage of such a low voltage transistor is determined by adding a predetermined voltage margin (for example, about +10% to +20%) to the low potential power supply voltage VDDD.

Thus, in the differential amplifier 10_1 included in the digital-to-analog converter 100, the clamp transistors 13A_1 to 13A_2$^K$ are provided between the tails of the differential pairs (11_1, 12_1) to (11_2$^K$, 12_2$^K$) and the current source transistors 14A_1 to 14A_2$^K$.

Each of the clamp transistors 13A_1 to 13A_2$^K$ holds the drain voltage of each of the current source transistors 14A_1 to 14A_2$^K$ at or below a voltage lower than the bias voltage BIAS minus the threshold voltage of each clamp transistor. In addition, the bias voltage BIAS supplied to each gate of the clamp transistors 13A_1 to 13A_2$^K$ is set to, for example, the low potential power supply voltage VDDD or a voltage value near the low potential power supply voltage VDDD.

Therefore, with the clamp transistors 13A_1 to 13A_2$^K$, the drain-source voltage of the current source transistors 14A_1 to 14A_2$^K$ included in the differential amplifier 10_1 may be held at or below the low potential power supply voltage VDDD, which is a voltage lower than the high potential power supply voltage VDDA.

As a result, the low voltage transistor with a low breakdown voltage as described above may be used as the current source transistors 14A_1 to 14A_2$^K$ that generate the tail currents flowing through each of the differential pairs (11_1, 12_1) to (11_2$^K$, 12_2$^K$) included in the differential amplifier 10_1.

The effects obtained by configuring the current source transistors 14A_1 to 14A_2$^K$ of the differential amplifier 10_1 shown in FIG. 1 with low voltage transistors will be described hereinafter.

The differential amplifier 10_1 shown in FIG. 1 includes a plurality of differential pairs (11_1, 12_1) to (11_2$^K$, 12_2$^K$) as described above. In the differential amplifier 10_1, the differential output currents output from each differential pair are combined according to the combination of the two reference voltages (Vgx, Vgy) supplied to the non-inverting input terminals of each of these differential pairs, and current-voltage converted by the current mirror circuit 20 and the amplification stage 30 to generate the output voltage signal Vout.

Here, the current source transistors 14A_1 to 14A_2$^K$ that supply the tail currents to each of the differential pairs (11_1, 12_1) to (11_2$^K$, 12_2$^K$) are required to supply the tail currents at a predetermined current ratio. In addition, in order to generate a highly accurate output voltage signal Vout, it is necessary to increase the relative accuracy of the differential pairs (11_1, 12_1) to (11_2$^K$, 12_2$^K$) as well as the relative accuracy of the current ratio of the tail currents output by the current source transistors 14A_1 to 14A_2$^K$ In the case of a configuration without the clamp transistors 13A_1 to 13A_2$^K$, the current source transistors 14A_1 to 14A_2$^K$ are configured with high voltage transistors, and in order to accommodate potential fluctuations at each tail of the differential pair, it is necessary to set its own channel length large so as to maintain the current accuracy even if the drain-source voltage fluctuates.

Therefore, the current source transistors 14A_1 to 14A_2$^K$ are generally larger in size than the design criteria (minimum value). Besides, the relative accuracy of the transistor also depends on the breakdown voltage (gate insulating film thickness) of the transistor, and as the breakdown voltage of the transistor increases, the manufacturing variations in gate insulating film thickness increase, so the relative accuracy decreases.

However, by providing the clamp transistors 13A_1 to 13A_2$^K$, the current source transistors 14A_1 to 14A_2$^K$ may be configured with low voltage transistors, and since they are not affected by potential fluctuations at each tail of the differential pair, the channel length of each current source transistor may be set small.

Therefore, like the differential amplifier 10_1, configuring the current source transistors 14A_1 to 14A_$2^K$ with low voltage transistors that have small manufacturing variations may achieve the same relative accuracy with a size that is several times smaller than configuring with high voltage transistors.

Furthermore, since the separation criteria between the transistors is also reduced, the layout area of a circuit including a large number of current source transistors may be reduced. As the current source transistors 14A_1 to 14A_$2^K$ are configured with low voltage transistors, the clamp transistors 13A_1 to 13A_$2^K$ are required to hold the breakdown voltage, but since the clamp transistors do not contribute to the relative accuracy of the current ratio, the clamp transistors may be configured based on the design criteria (minimum value) of high voltage transistors.

Therefore, in the digital-to-analog converter 100 shown in FIG. 1, a low voltage transistor with a low breakdown voltage is used as each of the current source transistors 14A_1 to 14A_$2^K$ that supply currents to flow through the differential pairs (11_1, 12_1) to (11_$2^K$, 12_$2^K$), thereby saving area without compromising digital-to-analog conversion accuracy.

It should be noted that the current mirror circuit 20 included in the differential amplifier 10_1 is not limited to the configuration shown in FIG. 1, and any current mirror circuit such as a cascode type may be employed.

In addition, instead of using the N-channel type differential pairs shown in FIG. 1, the differential pairs (11_1, 12_1) to (11_$2^K$, 12_$2^K$) included in the differential amplifier 10_1 may use P-channel type differential pairs or dual-conductivity type differential pairs that form pairs with N-channel type transistors and P-channel type transistors.

Thus, for convenience of explanation, each of the following embodiments will be described using a configuration example that includes $2^K$ N-channel type differential pairs similar to FIG. 1, but it goes without saying that partial substitutions as described above are possible as well.

Next, a specific example of the digital-to-analog converter 100 shown in FIG. 1 will be described. In the digital-to-analog converter 100 shown in FIG. 1, the differential amplifier 10_1 includes $2^K$ equivalent differential pairs, each of which is supplied with a tail current having a constant current ratio, and one voltage level corresponding to the lower K bits of the digital data signal DT is amplified and output from the voltage levels obtained by dividing the two reference voltages (Vgx, Vgy) selected by the decoder 50 into $2^K$.

FIG. 2A to FIG. 2C are diagrams showing examples of specifications when the digital-to-analog converter 100 is configured with four differential pairs (K=2).

In addition, each of FIG. 2A to FIG. 2C shows a relationship between a combination of the two reference voltages (Vgx, Vgy) that the decoder 50 assigns to the input voltages V1 to V4 supplied to the first to fourth non-inverting input terminals of the four differential pairs (11_1, 12_1) to (11_4, 12_4) respectively based on the lower 2 bits (D0, D1) of the digital data signal DT, and the output voltage signal Vout output from the differential amplifier 10_1 as a result.

Here, the output voltage signal Vout output from the differential amplifier 10_1 having four differential pairs is expressed by the following equation.

$$Vout=(V1+V2+V3+V4)/4$$

For convenience, the two reference voltages (Vgx, Vgy) are expressed as voltage levels (0, 4) in FIG. 2A to FIG. 2C. At this time, the output voltage signal Vout becomes a signal having one of the voltage levels 0 to 4 which are obtained by dividing the voltage levels 0 to 4 into four.

That is, the decoder 50 selects one set of the voltage levels (0, 4), (4, 8), (8, 12), and so on, for example, as the two reference voltages (Vgx, Vgy), from the reference voltage group composed of voltages at 4-level intervals using the values of the upper bit group that excludes the lower 2 bits (D0, D1) from the digital data signal DT. The example shown in FIG. 2A to FIG. 2C shows an example of the specification when the decoder 50 selects the voltage levels (0, 4) as the reference voltages (Vgx, Vgy). Therefore, FIG. 2A to FIG. 2C show an example of the specification in which the voltage levels 0 to 3 or 1 to 4, among the voltage levels 0, 1, 2, 3, and 4 obtained by dividing the voltage levels 0 to 4 into 22, i.e. four, are output as the output voltage signal Vout.

For example, FIG. 2A is a specification for extracting the voltage levels 1 to 4 including the reference voltage Vgy (voltage level 4) using the lower 2 bits (D0, D1) of the digital data signal DT. In the specification shown in FIG. 2A, based on four codes (0, 0) to (1, 1) represented by the lower 2 bits (D1, D0), each time the code value increases by one, the input voltages V1 to V4 supplied to the first to fourth non-inverting input terminals of the four differential pairs change from the state of voltage level 0 to the state of voltage level 4 in the order of V1, V2, V3, and V4.

FIG. 2B is a specification for extracting the voltage levels 0 to 3 including the reference voltage Vgx (voltage level 0) using the lower 2 bits (D0, D1) of the digital data signal DT. In the specification shown in FIG. 2B, based on four codes (0, 0) to (1, 1) represented by the lower 2 bits (D1, D0), each time the code value increases by one, the input voltages V1 to V3 supplied to the first to third non-inverting input terminals of the four differential pairs change from the state of voltage level 0 to the state of voltage level 4 in the order of V1, V2, and V3. However, in the specification of FIG. 2B, the input voltage V4 supplied to the fourth non-inverting input terminal is supplied with the fixed voltage level 0.

FIG. 2C is a specification for extracting the voltage levels 1 to 4, and is a specification that supplies the input voltages V3 and V4 having a common voltage level to the non-inverting input terminals of the third and fourth differential pairs among the four differential pairs.

At this time, even if the digital-to-analog converter 100 employs any of the specifications shown in FIG. 2A to FIG. 2C, the current sources (14A_1 to 14A_4) that supply currents to the four differential pairs (11_1, 12_1) to (11_4, 12_4) are configured with low voltage current source transistors, so the areas of the differential amplifier 10_1 and the digital-to-analog converter 100 may be saved.

FIG. 3 is a diagram showing an example of the specification when the digital-to-analog converter 100 shown in FIG. 1 is configured with eight differential pairs (K=3).

FIG. 3 shows a relationship between a combination of the two reference voltages (Vgx, Vgy) that the decoder 50 assigns to the input voltages V1 to V8 supplied to the first to eighth non-inverting input terminals of the eight differential pairs (11_1, 12_1) to (11_8, 12_8) respectively based on the lower 3 bits (D0, D1, D2) of the digital data signal DT, and the output voltage signal Vout output from the differential amplifier 10_1 as a result.

Here, the output voltage signal Vout output from the differential amplifier 10_1 having eight differential pairs is expressed by the following equation.

$$Vout = (V1 + V2 + V3 + V4 + V5 + V6 + V7 + V8)/8$$

For convenience, the two reference voltages (Vgx, Vgy) are expressed as voltage levels (0, 8) in FIG. 3. At this time, the output voltage signal Vout becomes a signal having one of the voltage levels 0 to 8 which are obtained by dividing the voltage levels 0 to 8 into eight.

That is, the decoder 50 selects one set of the voltage levels (0, 8), (8, 16), (16, 24), and so on, for example, as the two reference voltages (Vgx, Vgy), from the reference voltage group composed of voltages at 8-level intervals using the values of the upper bit group that excludes the lower 3 bits (D0 to D2) from the digital data signal DT. The example shown in FIG. 3 shows an example of the specification when the decoder 50 selects the voltage levels (0, 8) as the reference voltages (Vgx, Vgy). Therefore, FIG. 3 shows an example of the specification in which the voltage levels 0 to 7 or 1 to 8, among the voltage levels 0, 1, 2, 3, 4, 5, 6, 7, and 8 obtained by dividing the voltage levels 0 to 8 into 23, i.e. eight, are output as the output voltage signal Vout.

For example, FIG. 3 is a specification for extracting the voltage levels 1 to 8 including the reference voltage Vgy (voltage level 8) from the lower 3 bits (D0 to D2) of the digital data signal DT. Furthermore, in the specification shown in FIG. 3, the input voltages V3 and V4 having a common voltage level are supplied to the non-inverting input terminals of the third and fourth differential pairs among the eight differential pairs, and the input voltages V5 to V8 having a common voltage level are supplied to the non-inverting input terminals of the fifth to eighth differential pairs.

In addition, similar to the specifications shown in FIG. 2A to FIG. 2C, even with the specification shown in FIG. 3, various specifications may be employed in which the relationship between the voltage level and the lower bits of the digital data signal DT, and the assignment of the two reference voltages (Vgx, Vgy) to the input voltages V1 to V8 supplied to each non-inverting input terminal are different.

At this time, even if the digital-to-analog converter 100 employs the specification shown in FIG. 3, the current sources (14A_1 to 14A_8) that supply currents to the eight differential pairs (11_1, 12_1) to (11_8, 12_8) are configured with low voltage current source transistors, so the areas of the differential amplifier 10_1 and the digital-to-analog converter 100 may be saved.

Second Embodiment

Figure 4:
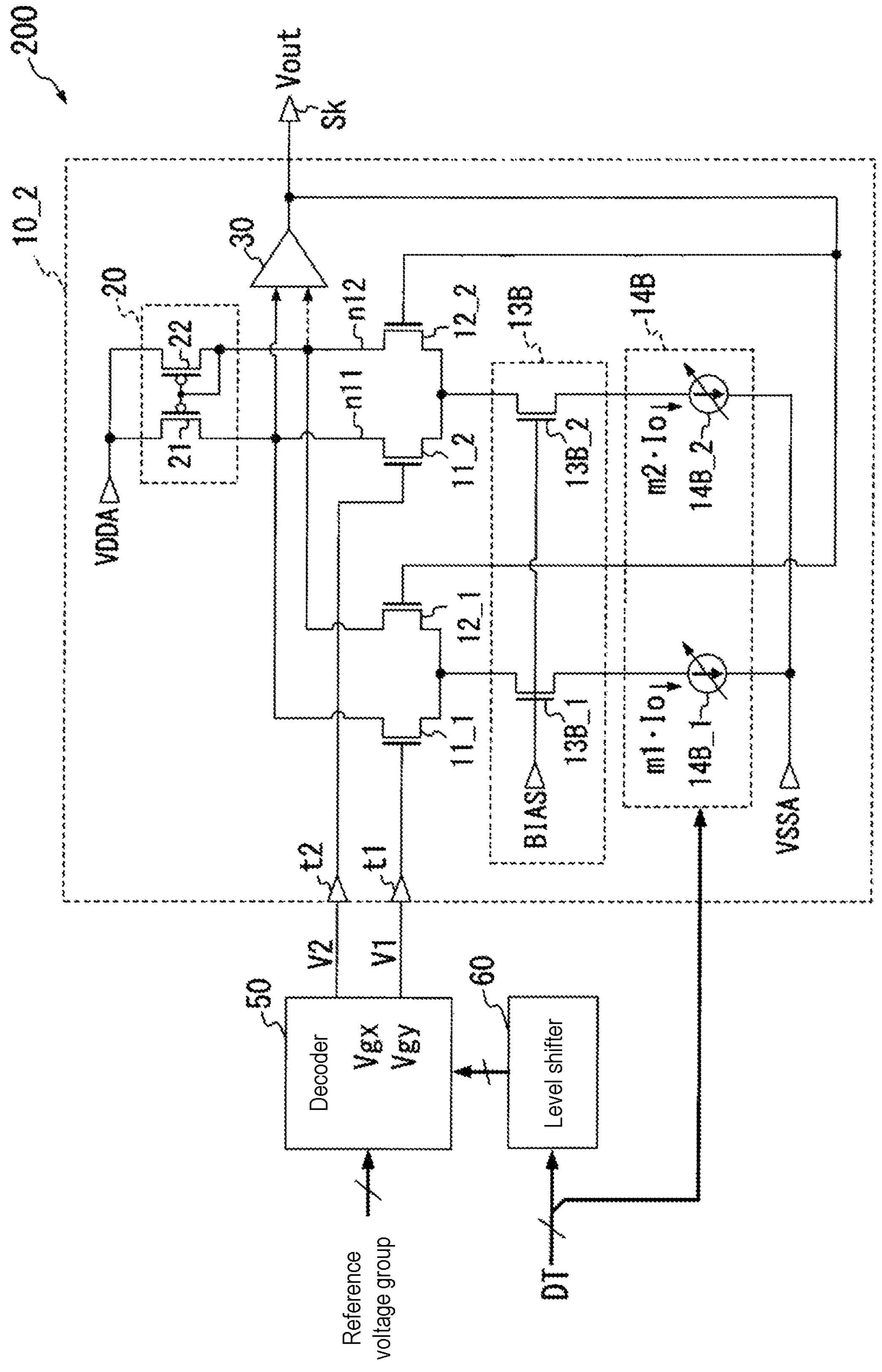
FIG. 4 is a circuit diagram showing the configuration of the digital-to-analog converter 200 according to the second embodiment of the disclosure.

FIG. 4 is a circuit diagram showing the configuration of a digital-to-analog converter 200 according to the second embodiment of the disclosure.

The digital-to-analog converter 200 receives a low voltage N-bit (N is a positive number of 3 or more) digital data signal DT that is to be converted, converts the digital data signal DT into an output voltage signal Vout having a high voltage analog voltage value, and outputs the output voltage signal Vout.

The digital-to-analog converter 200 shown in FIG. 4 includes a decoder 50, a level shifter 60, and a differential amplifier 10_2.

The level shifter 60 generates a high voltage N-bit digital data signal which is level-shifted in a direction that increases the amplitude of the signal level of the digital data signal DT, and supplies the digital data signal to the decoder 50.

The decoder 50 receives such a high voltage digital data signal as well as a reference voltage group. It should be noted that the reference voltage group includes a plurality of voltages each having a maximum voltage value corresponding to the maximum value that can be expressed by the digital data signal DT, a minimum voltage value corresponding to the minimum value, and a plurality of intermediate voltage values between the maximum voltage value and the minimum voltage value.

The decoder 50 selects two reference voltages having different voltage values from the reference voltage group as the reference voltages Vgx and Vgy, based on the high voltage digital data signal. Next, the decoder 50 distributes the selected two reference voltages Vgx and Vgy to the non-inverting input terminals t1 and t2 of the differential amplifier 10_2, and thereby generates the input voltages V1 and V2 to be input to the non-inverting input terminals t1 and t2. That is, the decoder 50 supplies the input voltages V1 and V2 each having one of the reference voltages Vgx and Vgy to the non-inverting input terminals t1 and t2 of the differential amplifier 10_2.

Based on the input voltages V1 and V2 each having one of the reference voltages Vgx and Vgy, the differential amplifier 10_2 outputs one of the voltage levels obtained by dividing the voltage between the reference voltages Vgx and Vgy into a power of 2 as the output voltage signal Vout.

The differential amplifier 10_2 includes two differential pairs (11_1, 12_1) and (11_2, 12_2) of the same conductivity type (N-channel type in FIG. 4), each of which is supplied with a tail current and whose output pairs are commonly connected to each other, a breakdown voltage protection circuit 13B, a tail current control circuit 14B, a current mirror circuit 20, and an amplification stage 30.

The current mirror circuit 20 includes P-channel type transistors 21 and 22 whose gates are commonly connected and whose sources are commonly connected. The high potential power supply voltage VDDA is applied to the source of each of the transistors 21 and 22. Further, the drain of the transistor 21 is connected to the node n11, and the gate and drain of the transistor 22 are connected to the node n12. Further, the nodes n11 and n12 are respectively connected to the commonly connected output pairs of the two differential pairs. With such a configuration, the current mirror circuit 20 functions as a common load for the two differential pairs described above.

The amplification stage 30 receives the output signal from one or both of the commonly connected output pairs (nodes n11, n12) of the two differential pairs to produce an amplification effect, and outputs the voltage generated by the amplification effect as the output voltage signal Vout via the output terminal Sk.

The output voltage signal Vout is fed back to the inverting input terminal of each of the differential pairs (11_1, 12_1) and (11_2, 12_2), that is, the gate of each of the N-channel type transistors (hereinafter also referred to as differential pair transistors) 12_1 and 12_2.

The voltage (Vgx or Vgy) received at the non-inverting input terminals t1 and t2 is supplied to the non-inverting input terminal of each of the differential pairs (11_1, 12_1) and (11_2, 12_2), that is, the gate of each of the N-channel type transistors (hereinafter also referred to as differential pair transistors) 11_1 and 11_2. In each of the differential pairs (11_1, 12_1) and (11_2, 12_2), the sources of the transistors forming a pair are connected to each other.

In addition, the transistors 11_1 and 11_2 have the same transistor characteristics, and the respective drains are commonly connected through the node n11. The transistors 12_1 and 12_2 have the same transistor characteristics, and the respective drains are commonly connected through the node n12. That is, the two differential pairs (11_1, 12_1) and (11_2, 12_2) have a parallel connection configuration in which the output pairs are commonly connected.

The breakdown voltage protection circuit 13B includes N-channel type transistors (hereinafter also referred to as clamp transistors) 13B_1 and 13B_2 provided respectively corresponding to the differential pairs (11_1, 12_1) and (11_2, 12_2). The drain of the clamp transistor 13B_1 is connected to the source of the differential pair (11_1, 12_1). The drain of the clamp transistor 13B_2 is connected to the source of the differential pair (11_2, 12_2). Further, the bias voltage BIAS having a predetermined voltage value is supplied to the gate of each of the clamp transistors 13B_1 and 13B_2.

The tail current control circuit 14B includes a variable current source 14B_1 that generates a current (tail current) to flow through the differential pair (11_1, 12_1), and a variable current source 14B_2 that generates a current (tail current) to flow through the differential pair (11_2, 12_2). The variable current source 14B_1 is connected between the source of the clamp transistor 13B_1 and the supply line of the reference power supply voltage VSSA (for example, 0 V), and the variable current source 14B_2 is connected between the source of the clamp transistor 13B_2 and the supply line of the reference power supply voltage VSSA. In addition, the variable current sources 14B_1 and 14B_2 have variable current ratios of the tail currents respectively flowing through the variable current sources 14B_1 and 14B_2, based on the lower bit group of the digital data signal DT. With such a configuration, the variable current source 14B_1 provides a current (m1·Io) obtained by multiplying the current ratio m1 set by the lower bit group of the digital data signal DT by the reference current Io, as a tail current, to flow through the differential pair (11_1, 12_1) via the clamp transistor 13B_1. On the other hand, the variable current source 14B_2 provides a current (m2·Io) obtained by multiplying the current ratio m2 set by the lower bit group of the digital data signal DT by the reference current Io, as a tail current, to flow through the differential pair (11_2, 12_2) via the clamp transistor 13B_2.

Here, each of the transistors 21 and 22, the differential pair transistors 11_1, 12_1, 11_2, and 12_2, and the clamp transistors 13B_1 and 13B_2 described above is configured with a high voltage transistor with a high breakdown voltage that operates at the high potential power supply voltage VDDA (for example, 8 V). The element breakdown voltage of such a high voltage transistor is determined by adding a predetermined voltage margin (for example, about +10% to +20%) to the high potential power supply voltage VDDA.

On the other hand, each of the variable current sources 14B_1 and 14B_2 is configured with a low voltage transistor with a low breakdown voltage that operates at a low potential power supply voltage VDDD (for example, 1.5 V) lower than the high potential power supply voltage VDDA. The element breakdown voltage of such a low voltage transistor is determined by adding a predetermined voltage margin (for example, about +10% to +20%) to the low potential power supply voltage VDDD.

Thus, in the differential amplifier 10_2 included in the digital-to-analog converter 200, the clamp transistors 13B_1 and 13B_2 are provided between the tails of the differential pairs (11_1, 12_1) and (11_2, 12_2) and the variable current sources 14B_1 and 14B_2.

The clamp transistor 13B_1 holds the voltage at the connection point with the variable current source 14B_1 at or below a voltage lower than the bias voltage BIAS minus the threshold voltage of the clamp transistor. The clamp transistor 13B_2 holds the voltage at the connection point with the variable current source 14B_2 at or below a voltage lower than the bias voltage BIAS minus the threshold voltage of the clamp transistor. In addition, the bias voltage BIAS supplied to each gate of the clamp transistors 13B_1 and 13B_2 is set to, for example, the low potential power supply voltage VDDD or a voltage value near the low potential power supply voltage VDDD.

Therefore, with the clamp transistors 13B_1 and 13B_2, the voltage applied to the variable current sources 14B_1 and 14B_2 included in the differential amplifier 10_2 may be held at or below the low potential power supply voltage VDDD, which is lower than the high potential power supply voltage VDDA.

As a result, a low voltage circuit including a low voltage transistor with a low breakdown voltage may be used as the variable current sources 14B_1 and 14B_2 that generate tail currents to flow through the differential pairs (11_1, 12_1) and (11_2, 12_2) included in the differential amplifier 10_2.

Therefore, similar to the differential amplifier 10_1 shown in FIG. 1, configuring the variable current sources 14B_1 and 14B_2 with low voltage circuits may achieve the desired digital-to-analog conversion accuracy with a size that is several times smaller than configuring with high voltage circuits. Furthermore, since the separation criteria between the transistors is also reduced, a high-density layout becomes possible and the area of the entire circuit may be reduced.

Thus, in the digital-to-analog converter 200 shown in FIG. 4, the variable current source that supplies the tail current to each differential pair of the differential amplifier having two differential pairs may be configured with a low voltage variable current source or a low voltage circuit that realizes a variable current source, so the area may be saved.

Next, a specific example of the digital-to-analog converter 200 shown in FIG. 4 will be described. In the digital-to-analog converter shown in FIG. 4 and FIG. 9, which will be described later, the differential amplifier includes $2^K$ equivalent differential pairs (K is a positive number of 1 or more), and the current ratio of the tail currents supplied to each differential pair is variably controlled, so as to amplify and output one voltage level corresponding to a predetermined lower bit group of the digital data signal DT from the voltage levels obtained by dividing the two reference voltages (Vgx, Vgy) selected by the decoder 50 into $2^M$ (M is a positive number greater than K).

FIG. 5 is a diagram showing an example of the specification when two differential pairs (K=1) included in the digital-to-analog converter 200 are controlled by a current ratio of three levels.

FIG. 5 shows a relationship between the two reference voltages (Vgx, Vgy) selected by the decoder 50 based on the digital data signal DT, a combination of the input voltages V1 and V2 input to the first and second non-inverting input terminals of the two differential pairs according to the lower 2 bits (D1, D0) of the digital data signal DT and the two reference voltages (Vgx, Vgy) assigned to the voltages V1 and V2, a combination of the current ratio (m1, m2) of the first tail current (m1·Io) and the second tail current (m2·Io) that respectively drive the differential pairs (11_1, 12_1) and (11_2, 12_2) to which the voltages V1 and V2 are supplied, and the output voltage signal Vout amplified and output from the differential amplifier 10_2.

It should be noted that in order to keep the driving ability of the differential amplifier 10_2 uniform with respect to the output voltage signal Vout, the sum of the tail currents of the two differential pairs is controlled to be approximately constant.

Here, the voltage value of the output voltage signal Vout output by the differential amplifier 10_2 that controls the tail current of each of the two differential pairs by a current ratio of three levels is expressed by the following equation.

$$Vout = (m1 \cdot V1 + m2 \cdot V2)/(m1 + m2)$$

For convenience, when the two reference voltages (Vgx, Vgy) are expressed as the voltage levels (0, 4), the output voltage signal Vout represents one of the voltage levels 0 to 4 that divides the voltage level (0, 4) into four.

That is, the decoder 50 selects one set of the voltage levels (0, 4), (4, 8), (8, 12), and so on, for example, as the two reference voltages (Vgx, Vgy), from the reference voltage group composed of voltages at 4-level intervals using the values of the upper bit group that excludes the lower 2 bits (D0, D1) from the digital data signal DT.

The example shown in FIG. 5 shows an example of the specification when the decoder 50 selects the voltage levels (0, 4) as the reference voltages (Vgx, Vgy). Thus, by setting the lower 2 bits (D1, D0), the voltage levels 0 to 3 or 1 to 4, among the voltage levels 0, 1, 2, 3, and 4 obtained by dividing the voltage levels 0 to 4 into 22 (M=2), i.e. four, may be extracted as the output voltage signal Vout.

Furthermore, in the specification of FIG. 5, for the voltage levels 0 to 4, in the case of the voltage level 0, the voltage level 0 is commonly assigned as the input voltages V1 and V2 to be supplied to the first and second non-inverting input terminals of the two differential pairs, and the current ratio (m1, m2) of the tail currents of the differential pairs receiving the voltages V1 and V2 is controlled to (1, 1). In the case of the voltage levels 1 to 3, the voltage levels 4 and 0 are respectively assigned as the input voltages V1 and V2 to be supplied to the first and second non-inverting input terminals of the two differential pairs, and the current ratio (m1, m2) of the tail currents of the differential pairs receiving the voltages V1 and V2 is sequentially controlled to (0.5, 1.5), (1, 1), and (1.5, 0.5). In the case of the voltage level 4, the voltage level 4 is commonly assigned as the input voltages V1 and V2 to be supplied to the first and second non-inverting input terminals of the two differential pairs, and the current ratio (m1, m2) of the tail currents of the differential pairs receiving the voltages V1 and V2 is controlled to (1, 1). It should be noted that the setting of the lower 2 bits (D1, D0) in FIG. 5 is assigned to the voltage levels 1 to 4 including the reference voltage Vgy (voltage level 4). In the specification of FIG. 5, as in FIG. 2A and FIG. 2B, the assignment of each voltage level and the lower bits of the digital data signal DT may be changed.

Figure 6:
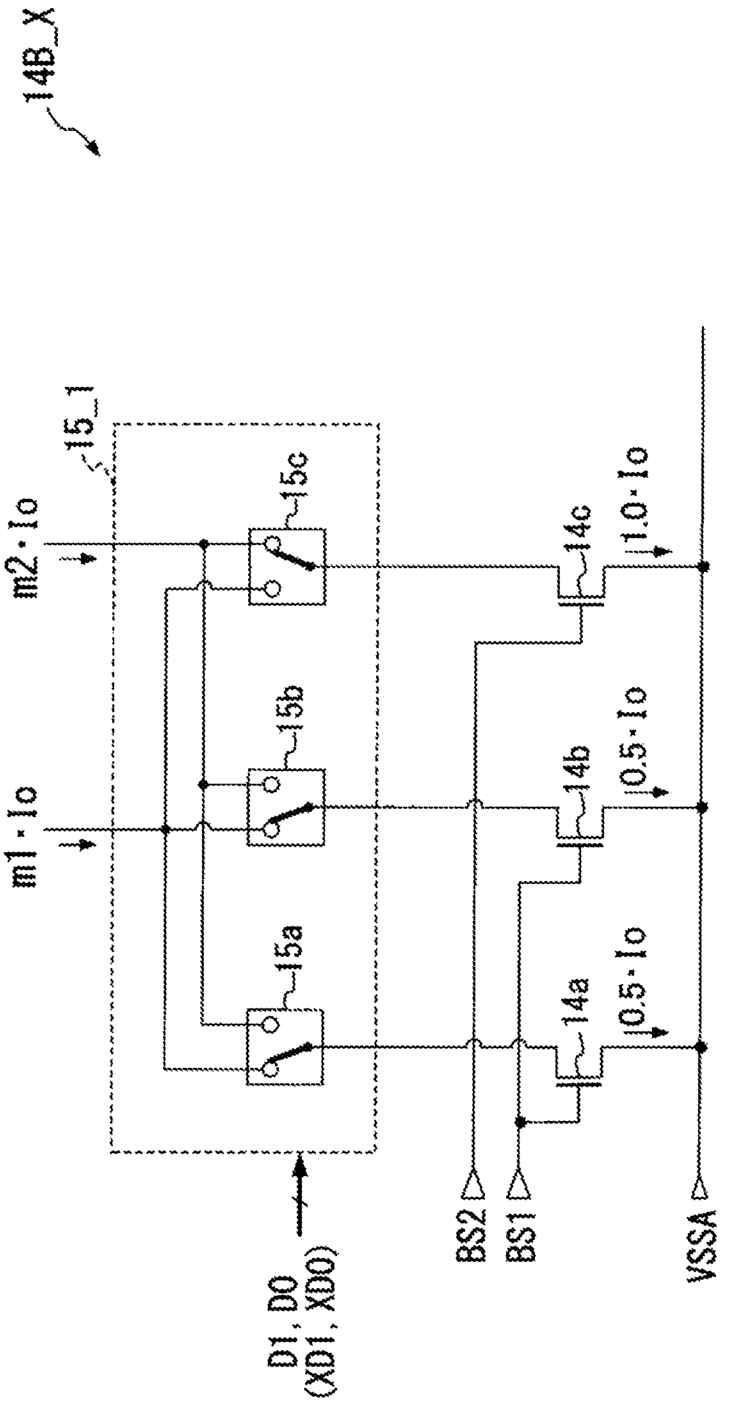
FIG. 6 is a circuit diagram showing the configuration of the tail current control circuit 14B_X.

FIG. 6 is a circuit diagram showing a tail current control circuit 14B_X as a specific circuit configuration when realizing the tail current control circuit 14B with the specification shown in FIG. 5. The tail current control circuit 14B_X has a function equivalent to the variable current sources (14B_1, 14B_2) that supply tail currents (m1·Io, m2·Io) to two differential pairs based on the lower 2 bits (D1, D0) of the digital data signal DT and the complementary bits (XD1, XD0).

The tail current control circuit 14B_X includes at least three constant current sources 14*a* to 14*c* that generate constant currents at a current ratio of 0.5:0.5:1.0, and switches 15*a* to 15*c* that control a combination of currents of the constant current sources 14*a* to 14*c* using the lower 2 bits (D1, D0). The tail currents (m1·Io, m2·Io) are generated by controlling the current ratio (m1, m2) of the tail currents respectively supplied to the two differential pairs through control of the switches 15*a* to 15*c*. At this time, the constant current sources 14*a* to 14*c* are configured with low voltage transistors and the switches 15*a* to 15*c* are also configured with low voltage transistor switches, thereby saving the areas of the differential amplifier 10_2 and the digital-to-analog converter 200. In FIG. 6, the constant current sources 14*a* to 14*c* are shown as transistors whose gates are supplied with bias voltages BS1 and BS2 according to the current ratio. In contrast thereto, it is also possible to use only one type of bias voltage, BS1, and to configure the constant current source 14*c* with two transistors connected in parallel.

FIG. 7 is a diagram showing an example of the specification when the tail currents of two differential pairs included in the digital-to-analog converter 200 shown in FIG. 4 are controlled by a current ratio of seven levels.

FIG. 7 shows a relationship between the two reference voltages (Vgx, Vgy) selected by the decoder 50 based on the digital data signal DT, a combination of the input voltages V1 and V2 input to each non-inverting input terminal of the two differential pairs according to the lower 3 bits (D2, D1, D0) of the digital data signal DT and the two reference voltages (Vgx, Vgy) assigned to the voltages V1 and V2, a combination of the current ratio (m1, m2) when supplying tail currents to the two differential pairs, and the output voltage signal Vout amplified and output from the differential amplifier 10_2. For convenience, when the two reference voltages (Vgx, Vgy) are expressed as the voltage levels (0, 8), the output voltage signal Vout represents one of the voltage levels 0 to 8 that divides the voltage level (0, 8) into eight. Then, by setting the lower 3 bits (D2, D1, D0), the voltage levels 0 to 7 or 1 to 8, among the voltage levels 0 to 8 obtained by dividing the voltage levels 0 to 8 into 23 (M=3), i.e. eight, may be extracted as the output voltage signal Vout.

Furthermore, in the specification of FIG. 7, for the voltage levels 0 to 8, in the case of the voltage level 0, the voltage level 0 is commonly assigned as the input voltages V1 and V2 to be supplied to the first and second non-inverting input terminals of the two differential pairs, and the current ratio (m1, m2) of the tail currents of the differential pairs receiving voltages V1 and V2 is controlled to (1, 1). In the case of the voltage levels 1 to 7, the voltage levels 8 and 0 are respectively assigned as the input voltages V1 and V2 to be supplied to the first and second non-inverting input terminals of the two differential pairs, and the current ratio (m1, m2) of the tail currents of the differential pairs receiving the voltages V1 and V2 is sequentially controlled to (0.25, 1.75), (0.5, 1.5), (0.75, 1.25), (1, 1), (1.25, 0.75), (1.5, 0.5), and (1.75, 0.25). In the case of the voltage level 8, the voltage level 8 is commonly assigned as the input voltages V1 and V2 to be supplied to the first and second non-inverting input terminals of the two differential pairs, and the current ratio (m1, m2) of the tail currents of the differential pairs receiving the voltages V1 and V2 is controlled to (1, 1). It should be noted that the setting of the lower 3 bits (D2, D1, D0) in FIG. 7 is assigned to the voltage levels 1 to 8 including the reference voltage Vgy (voltage level 8). In the specification of FIG. 7, as in FIG. 2A and FIG. 2B, the assignment of each voltage level and the lower bits of the digital data signal DT may also be changed.

Figure 8:
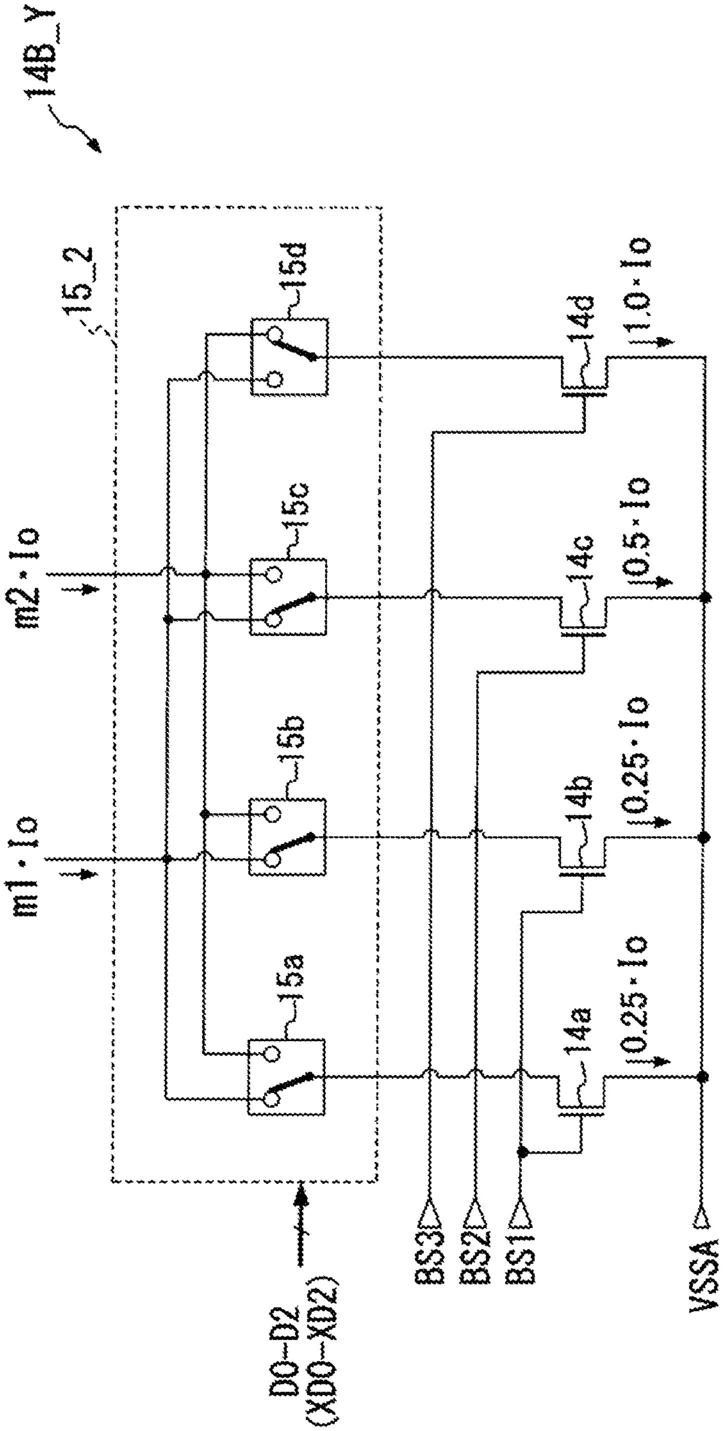
FIG. 8 is a circuit diagram showing the configuration of the tail current control circuit 14B_Y.

FIG. 8 is a circuit diagram showing a tail current control circuit 14B_Y as a specific circuit configuration when realizing the tail current control circuit 14B with the specification shown in FIG. 7. The tail current control circuit 14B_Y has a function equivalent to the variable current sources (14B_1, 14B_2) that supply tail currents (m1·Io, m2·Io) to two differential pairs based on the lower 3 bits (D2, D1, D0) of the digital data signal DT and the complementary bits (XD2, XD1, XD0).

The tail current control circuit 14B_Y includes constant current sources 14*a* to 14*d* that generate constant currents at a current ratio of 0.25:0.25:0.5:1.0, and switches 15*a* to 15*d* that control a combination of currents of the constant current sources 14*a* to 14*d* using the lower 3 bits (D2, D1, D0).

Each of the constant current sources 14*a* to 14*d* includes, for example, an N-channel type transistor whose source is connected to the supply line of the reference power supply voltage VSSA (for example, 0 V). At this time, the drain of the transistor serving as the constant current source 14*a* is connected to the switch 15*a*, and the drain of the transistor serving as the constant current source 14*b* is connected to the switch 15*b*. Further, the drain of the transistor serving as the constant current source 14*c* is connected to the switch 15*c*, and the drain of the transistor serving as the constant current source 14*d* is connected to the switch 15*d*. Furthermore, a predetermined bias voltage BS1 is supplied to the gate of each of the transistors forming the constant current sources 14*a* and 14*b*, and a bias voltage BS2 higher than the bias voltage BS1 is supplied to the gate of the transistor forming the constant current source 14*c*. A bias voltage BS1 higher than the bias voltage BS2 is supplied to the gate of the transistor forming the constant current source 14*d*.

In the tail current control circuit 14B_Y, the tail currents (m1·Io, m2·Io) are generated by controlling the current ratio (m1, m2) of the tail currents supplied to the two differential pairs through the switches 15*a* to 15*d*. At this time, configuring the constant current sources 14*a* to 14*d* with low voltage transistors and configuring the switches 15*a* to 15*d* also with low voltage transistor switches may save the areas of the differential amplifier 10_2 and the digital-to-analog converter 200.

In addition, although the tail current control circuit 14B_Y uses at least four constant current sources to control the tail currents (m1·Io, m2·Io) at a tail current ratio of seven levels, five or more constant current sources may be used for control at a tail current ratio of seven levels.

Third Embodiment

Figure 9:
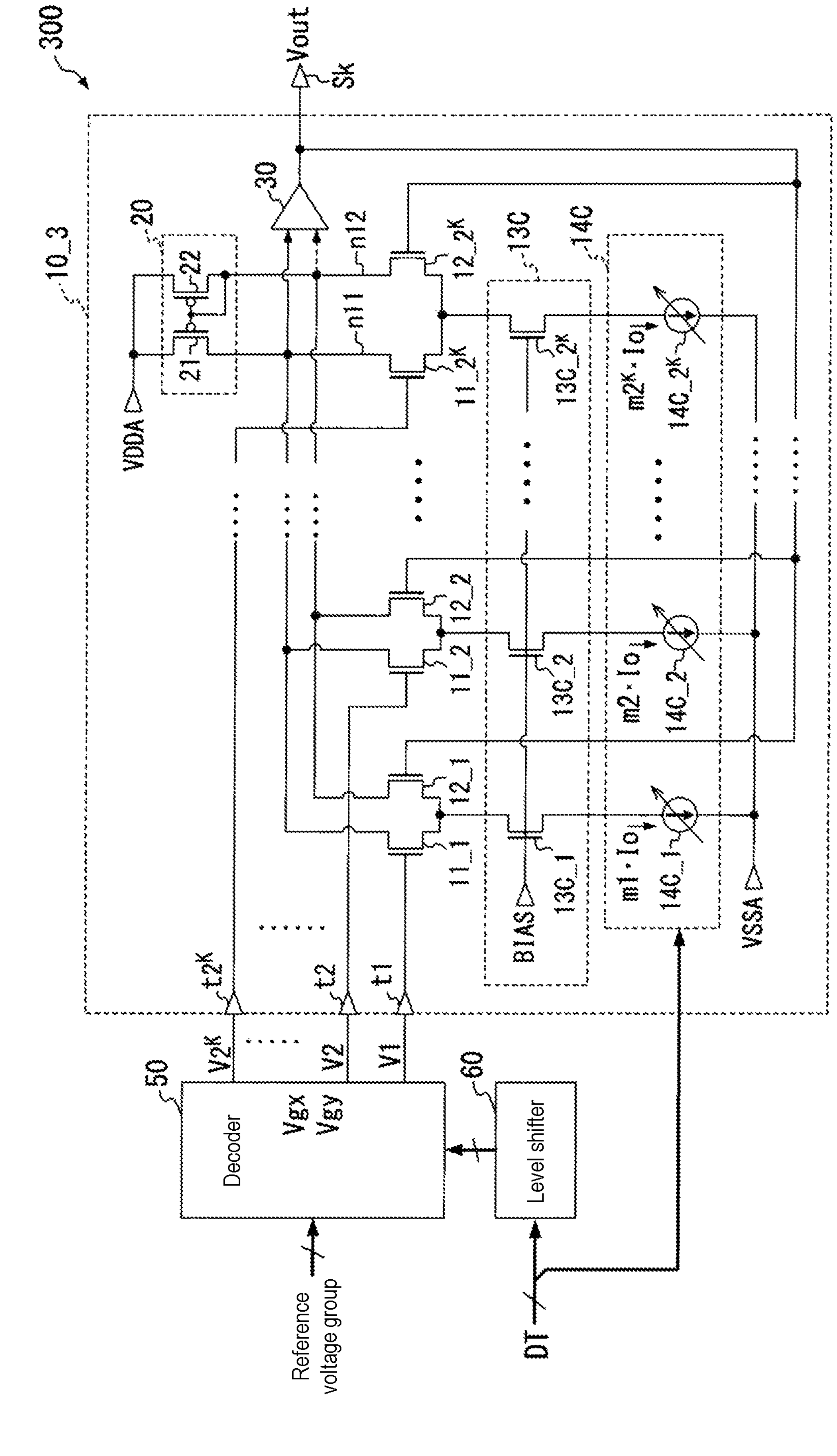
FIG. 9 is a circuit diagram showing the configuration of the digital-to-analog converter 300 according to the third embodiment of the disclosure.

FIG. 9 is a circuit diagram showing the configuration of a digital-to-analog converter 300 according to the third embodiment of the disclosure.

It should be noted that the digital-to-analog converter 300 employs a differential amplifier 10_3 instead of the differential amplifier 10_1 shown in FIG. 1, but the other configurations, that is, the decoder 50 and the level shifter 60, are the same as shown in FIG. 1. Further, the differential amplifier 10_3 has the same configuration as shown in FIG. 1 except that a breakdown voltage protection circuit 13C is used in place of the breakdown voltage protection circuit 13A shown in FIG. 1 and a tail current control circuit 14C is used in place of the tail current control circuit 14A.

The breakdown voltage protection circuit 13C includes N-channel type transistors (hereinafter also referred to as clamp transistors) 13C_1 to 13C_2$^K$ provided respectively corresponding to the differential pairs (11_1, 12_1) to (11_2$^K$, 12_2$^K$). The drains of the clamp transistors 13C_1 to 13C_2$^K$ are respectively connected to the sources of the corresponding differential pairs among the differential pairs (11_1, 12_1) to (11_2$^K$, 12_2$^K$). Further, the bias voltage BIAS having a predetermined voltage value is supplied to the gate of each of the clamp transistors 13C_1 to 13C_2$^K$.

The tail current control circuit 14C includes variable current sources 14C_1 to 14C_2$^K$ that individually generate tail currents to flow through the differential pairs (11_1, 12_1) to (11_2$^K$, 12_2$^K$).

Each of the variable current sources 14C_1 to 14C_2$^K$ is connected between the source of each of the clamp transistors 13C_1 to 13C_2$^K$ and the supply line of the reference power supply voltage VSSA (for example, 0 V). In addition, each of the variable current sources 14C_1 to 14C_2$^K$ has a variable current ratio of the tail currents respectively flowing through the variable current sources 14C_1 to 14C_2$^K$, based on the lower bit group of the digital data signal DT. With such a configuration, the variable current sources 14C_1 to 14C_2$^K$ respectively provide currents (m1·Io) to (m2$^K$·Io) obtained by multiplying the current ratios m1 to m2$^K$ set by the lower bit group of the digital data signal DT by the reference current Io, as tail currents, to flow through the differential pairs (11_1, 12_1) to (11_2$^K$, 12_2$^K$) via the clamp transistors 13C_1 to 13C_2$^K$.

Here, each of the transistors 21 and 22 of the current mirror circuit 20, the differential pair transistors 11_1 to 11_2$^K$ and 12_1 to 12_2$^K$, and the clamp transistors 13C_1 to 13C_2$^K$ is configured with a high voltage transistor with a high breakdown voltage that operates at the high potential power supply voltage VDDA (for example, 8 V). The element breakdown voltage of such a high voltage transistor is determined by adding a predetermined voltage margin (for example, about +10% to +20%) to the high potential power supply voltage VDDA.

On the other hand, each of the variable current sources 14C_1 to 14C_2$^K$ is configured with a low voltage transistor with a low breakdown voltage that operates at the low potential power supply voltage VDDD (for example, 1.5 V) lower than the high potential power supply voltage VDDA. The element breakdown voltage of such a low voltage transistor is determined by adding a predetermined voltage margin (for example, about +10% to +20%) to the low potential power supply voltage VDDD.

Thus, in the differential amplifier 10_3 included in the digital-to-analog converter 300, the clamp transistors 13C_1 to 13C_2$^K$ are provided between the tails of the differential pairs (11_1, 12_1) to (11_2$^K$, 12_2$^K$) and the variable current sources 14C_1 to 14C_2$^K$.

Here, the clamp transistor 13C_1 holds the voltage at the connection point with the variable current source 14C_1 at or below a voltage lower than the bias voltage BIAS minus the threshold voltage of the clamp transistor. The clamp transistor 13C_2 holds the voltage at the connection point with the variable current source 14C_2 at or below a voltage lower than the bias voltage BIAS minus the threshold voltage of the clamp transistor. Similarly, each of the clamp transistors 13C_3 to 13C_2$^K$ also holds the voltage at the connection point with the respective connected variable current source at or below a voltage lower than the bias voltage BIAS minus the threshold voltage of the clamp transistor. In addition, the bias voltage BIAS supplied to each gate of the clamp transistors 13C_1 to 13C_2$^K$ is set to, for example, the low potential power supply voltage VDDD or a voltage value near the low potential power supply voltage VDDD.

Therefore, with the clamp transistors 13C_1 to 13C_2$^K$, the voltage applied to each of the variable current sources 14C_1 to 14C_2$^K$ included in the differential amplifier 10_3 may be held at or below the low potential power supply voltage VDDD, for example, which is a voltage lower than the high potential power supply voltage VDDA.

As a result, a low voltage circuit including a low voltage transistor with a low breakdown voltage may be used as each of the variable current sources 14C_1 to 14C_2$^K$ that generate tail currents to respectively flow through the differential pairs (11_1, 12_1) to (11_2$^K$, 12_2$^K$) included in the differential amplifier 10_3.

Therefore, similar to the differential amplifier 10_1 shown in FIG. 1, configuring each of the variable current sources 14C_1 to 14C_2$^K$ with a low voltage circuit may achieve the desired digital-to-analog conversion accuracy with a size that is several times smaller than configuring with a high voltage circuit.

Next, a specific example of the digital-to-analog converter 300 shown in FIG. 9 will be described.

FIG. 10 is a diagram showing an example of the specification when the digital-to-analog converter 300 is configured with four differential pairs (K=2).

FIG. 10 shows a relationship between a combination of the two reference voltages (Vgx, Vgy) that the decoder 50 assigns to the input voltages V1 to V4 supplied to the first to fourth non-inverting input terminals of the four differential pairs (11_1, 12_1) to (11_4, 12_4) based on the lower 3 bits (D0, D1, D2) of the digital data signal DT, a combination of the current ratio (m1, m2) when supplying tail currents to the four differential pairs, and the output voltage signal Vout amplified and output from the differential amplifier 10_3. It should be noted that in order to keep the driving ability of the differential amplifier 10_3 uniform with respect to the output voltage signal Vout, the sum of the tail currents of the four differential pairs is controlled to be approximately constant.

Here, the voltage value of the output voltage signal Vout output by the differential amplifier 10_3 that controls the tail current of each of the four differential pairs by a current ratio of three levels is expressed by the following equation.

$$Vout = (m1 \cdot V1 + m2 \cdot V2 + m3 \cdot V3 + m4 \cdot V4/(m1 + m2 + m3 + m4)$$

For convenience, the two reference voltages (Vgx, Vgy) are expressed as voltage levels (0, 8) in FIG. 10. At this time, the output voltage signal Vout becomes a signal having one of the voltage levels 0 to 8 which are obtained by dividing the voltage levels 0 to 8 into eight.

That is, the decoder 50 selects one set of the voltage levels (0, 8), (8, 16), (16, 24), and so on, for example, as the two reference voltages (Vgx, Vgy), from the reference voltage group composed of voltages at 8-level intervals using the values of the upper bit group that excludes the lower 3 bits (D0 to D2) from the digital data signal DT. The example shown in FIG. 10 shows an example of the specification when the decoder 50 selects the voltage levels (0, 8) as the reference voltages (Vgx, Vgy). Therefore, FIG. 10 shows an example of the specification in which the voltage levels 0 to 7 or 1 to 8, among the voltage levels 0, 1, 2, 3, 4, 5, 6, 7, and 8 obtained by dividing the voltage levels 0 to 8 into 23 (M=3), i.e. eight, are output as the output voltage signal Vout.

Furthermore, in the specification shown in FIG. 10, for the voltage levels 0 to 8, the input voltages V3 and V4 having a common voltage level are supplied to the non-inverting input terminals of the third and fourth differential pairs among the four differential pairs, and the current ratio (m3, m4) of the tail currents of the differential pairs receiving the input voltages V3 and V4 is controlled to (1, 1).

Here, in the case of the voltage level 0, the voltage level 0 is commonly assigned as the input voltages V1 to V4 to be supplied to the first to fourth non-inverting input terminals of the four differential pairs, and the current ratio (m1, m2) of the tail currents of the differential pairs receiving the input voltages V1 and V2 is controlled to (1, 1). In the case of the voltage levels 1 to 3, the voltage level 8 is assigned as the input voltage V1 to be supplied to the first non-inverting input terminal of the four differential pairs, the voltage level 0 is assigned as the input voltages V2 to V4 to be supplied to the second to fourth non-inverting input terminals, and the current ratio (m1, m2) of the tail currents of the differential pairs receiving the input voltages V1 and V2 is sequentially controlled to (0.5, 1.5), (1, 1), and (1.5, 0.5). In the case of the voltage level 4, the voltage level 8 is commonly assigned as the input voltages V1 and V2 to be supplied to the first and second non-inverting input terminals of the four differential pairs, the voltage level 0 is commonly assigned as the input voltages V3 and V4 to be supplied to the third and fourth non-inverting input terminals, and the current ratio (m1, m2) of the tail currents of the differential pairs receiving the voltages V1 and V2 is controlled to (1, 1). In the case of the voltage levels 5 to 7, the voltage level 8 is assigned as the input voltages V1, V3, and V4 to be supplied to the first, third, and fourth non-inverting input terminals of the four differential pairs, the voltage level 0 is assigned as the input voltage V2 to be supplied to the second non-inverting input terminal, and the current ratio (m1, m2) of the tail currents of the differential pairs receiving the input voltages V1 and V2 is sequentially controlled to (0.5, 1.5), (1, 1), and (1.5, 0.5). In the case of the voltage level 8, the voltage level 8 is commonly assigned as the input voltages V1 to V4 to be supplied to the first to fourth non-inverting input terminals of the four differential pairs, and the current ratio (m1, m2) of the tail currents of the differential pairs receiving the input voltages V1 and V2 is controlled to (1, 1). It should be noted that the setting of the lower 3 bits (D2, D1, D0) in FIG. 10 is assigned to the voltage levels 1 to 8 including the reference voltage Vgy (voltage level 8).

It should be noted that, even with the specification of FIG. 10, the assignment of the voltage levels and the lower bits of digital data, the assignment of the two reference voltages (Vgx, Vgy) to the input voltages V1 to V4 supplied to the respective non-inverting input terminals, or the assignment of the current ratios m1 to m4 of the tail currents of the differential pairs receiving the input voltages V1 to V4 may take various forms other than the above embodiments.

Figure 11:
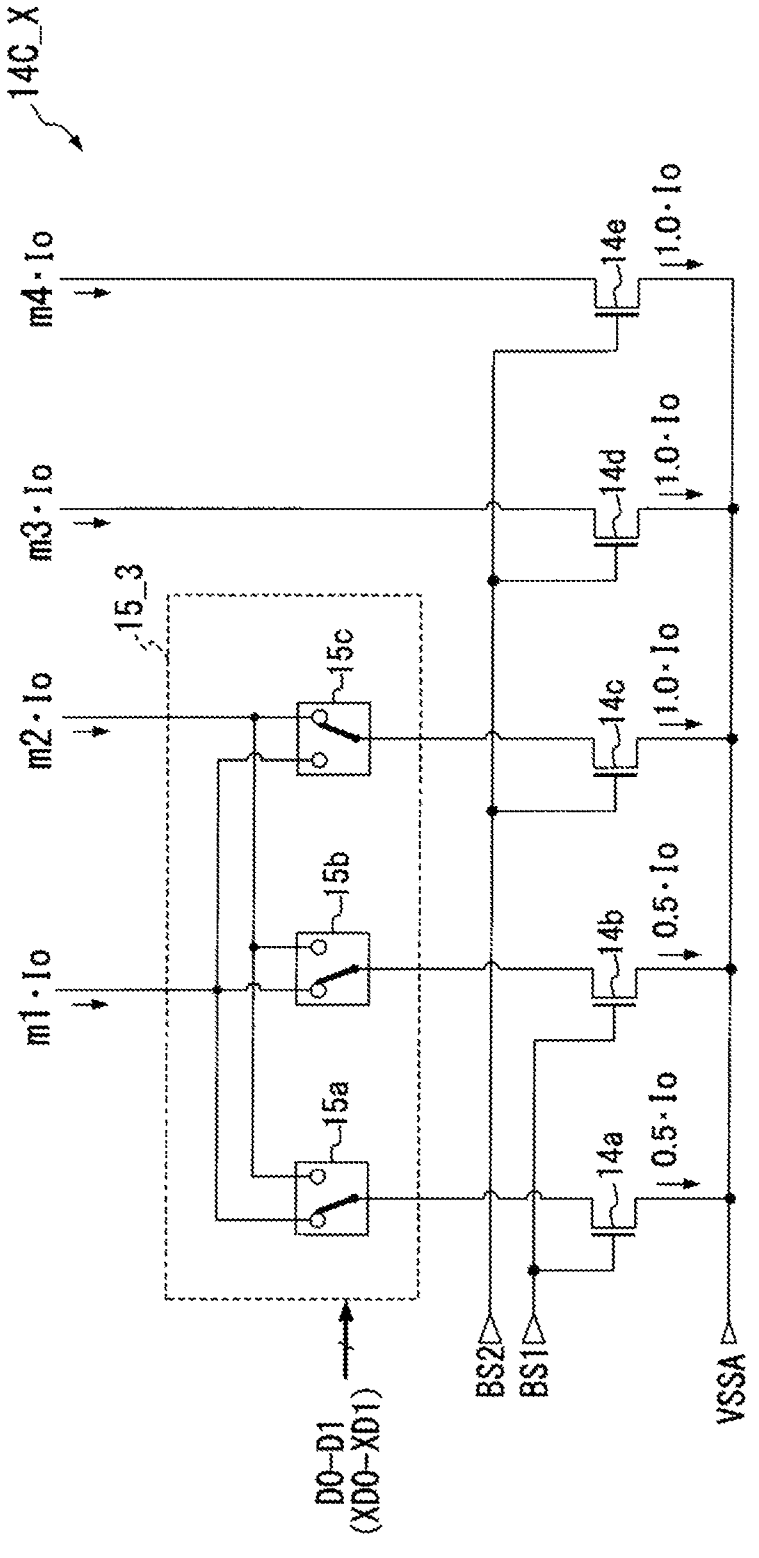
FIG. 11 is a circuit diagram showing the configuration of the tail current control circuit 14C_X.

FIG. 11 is a circuit diagram showing a tail current control circuit 14C_X as a specific circuit configuration when realizing the tail current control circuit 14C with the specification shown in FIG. 10. The tail current control circuit 14C_X has a function equivalent to the variable current sources (14C_1 to 14C_4) that supply tail currents (m1·Io, m2·Io, m3·Io, m4·Io) to four differential pairs based on the lower 2 bits (D1, D0) of the digital data signal DT and the complementary bits (XD1, XD0).

The tail current control circuit 14C_X includes constant current sources 14*a* to 14*e* that generate constant currents (0.5·Io, 0.5·Io, Io, Io, Io) at a current ratio of 0.5:0.5:1:1:1, and switches 15*a* to 15*c* that control a combination of currents of the constant current sources 14*a* to 14*e* using the lower 2 bits (D1, D0) and the complementary bits (XD1, XD0).

Each of the constant current sources 14*a* to 14*e* includes, for example, an N-channel type transistor whose source is connected to the supply line of the reference power supply voltage VSSA (for example, 0 V). At this time, the drain of the transistor serving as the constant current source 14*a* is connected to the switch 15*a*, the drain of the transistor serving as the constant current source 14*b* is connected to the switch 15*b*, and the drain of the transistor serving as the constant current source 14*c* is connected to the switch 15*c*. Further, the drain of the transistor serving as the constant current source 14*d* is directly connected to the tail of the third differential pair of the four differential pairs, and the drain of the transistor serving as the constant current source 14*e* is directly connected to the tail of the fourth differential pair of the four differential pairs. Furthermore, a predetermined bias voltage BS1 is supplied to the gate of each of the transistors forming the constant current sources 14*a* and 14*b*, and a bias voltage BS2 higher than the bias voltage BS1 is supplied to the gate of each transistor forming the constant current sources 14*c* to 14*e*.

In the tail current control circuit 14C_X, the tail currents (m1·Io, m2·Io) are generated by controlling the current ratio (m1, m2) of the tail currents supplied to the first and second differential pairs of the four differential pairs through control of the switches 15*a* to 15*c*. In addition, in the tail current control circuit 14C_X, the tail currents (m3·Io, m4·Io) respectively supplied to the third and fourth differential pairs of the four differential pairs are fixed to (Io, Io).

Therefore, the constant current sources 14*a* to 14*e* are configured with low voltage transistors and the switches 15*a* to 15*c* are configured with low voltage transistor switches, thereby saving the areas of the differential amplifier 10_3 and the digital-to-analog converter 300.

Fourth Embodiment

Next, a display device having a data driver including the digital-to-analog converter according to the disclosure will be described.

Figure 12:
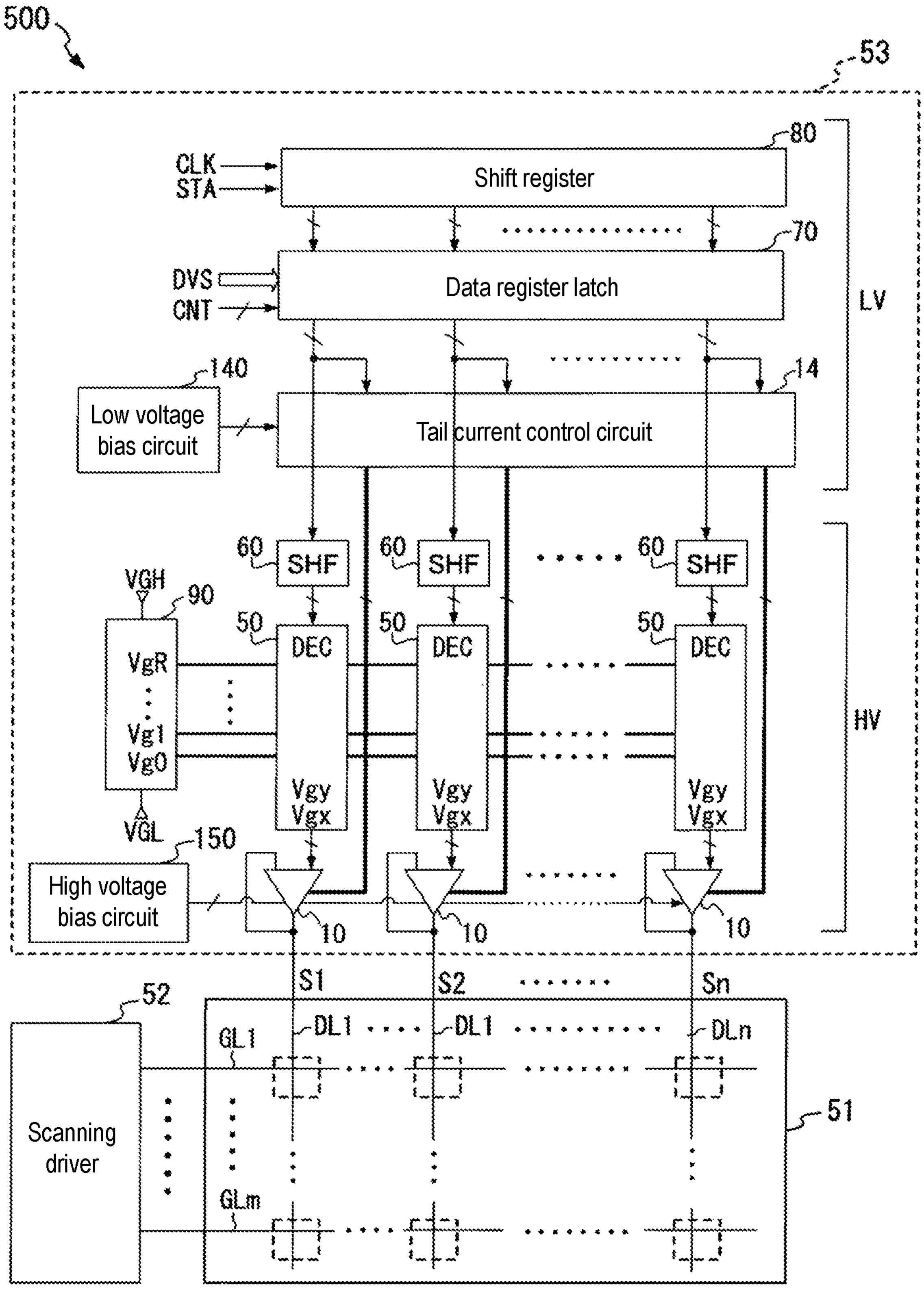
FIG. 12 is a block diagram showing the configuration of the display device 500 having the data driver including the digital-to-analog converter according to the disclosure.

FIG. 12 is a block diagram showing the schematic configuration of a display device 500.

With reference to FIG. 12, the display device 500 includes a display panel 51, a scanning driver 52, and a data driver 53.

The display panel 51 is composed of, for example, a liquid crystal panel or an organic EL panel, and includes m horizontal scanning lines GL1 to GLm (m is a natural number of 2 or more) extending in the horizontal direction of a two-dimensional screen, and n data lines DL1 to DLn (n is a natural number of 2 or more) extending in the vertical direction of the two-dimensional screen. A display cell serving as a pixel is formed at each intersection of the horizontal scanning line and the data line.

The scanning driver 52 sequentially applies a horizontal scanning pulse to each of the horizontal scanning lines GL1 to GLm of the display panel 51 based on a scanning timing signal supplied from a display controller (not shown).

The data driver 53 receives a clock signal CLK, a start pulse signal STA, a video digital signal DVS, and various control signals CNT from the display controller. Thereby, the data driver 53 generates drive signals S1 to Sn having voltage values corresponding to the brightness level indicated by the video digital signal DVS, and supplies the drive signals S1 to Sn to the data lines DL1 to DLn of the display panel 51, respectively.

The data driver 53 includes a shift register 80, a data register latch 70, n level shifters 60, a reference voltage group generation part 90, n decoders 50, n differential amplifiers 10, a tail current control circuit 14 forming a part of the differential amplifier 10, a low voltage bias circuit 140, and a high voltage bias circuit 150.

It should be noted that the data driver 53 is formed on a semiconductor IC chip, and the inside of the chip is divided into a low voltage region LV where low voltage circuit elements are formed and a high voltage region HV where high voltage circuit elements are formed. At this time, the shift register 80, the data register latch 70, the tail current control circuit 14, and the low voltage bias circuit 140 are arranged in the low voltage region LV. Circuit parts (differential pair, breakdown voltage protection circuit, current mirror circuit, and amplification stage), excluding the tail current control circuit in the differential amplifier 10, and the high voltage bias circuit 150 are arranged together with the level shifter 60, the reference voltage group generation part 90, and the decoder 50 in the high voltage region HV.

In response to the start pulse signal STA, the shift register 80 generates a plurality of latch timing signals for selecting latches in synchronization with the clock signal CLK, and supplies the latch timing signals to the data register latch 70.

The data register latch 70 captures every n pieces of digital data, which represents the brightness level of each pixel included in the video digital signal as a digital value, at the timing of the latch timing signal supplied from the shift register 80, and supplies the digital data to each of the level shifters 60 as n digital data signals representing the digital data. Furthermore, the data register latch 70 supplies a lower bit group (for example, lower 2 or 3 bits) LSb of each of the n digital data signals to the tail current control circuit 14.

Each level shifter 60 applies a level shifting process to the digital data signal received by itself to increase the signal amplitude, and supplies a high voltage digital data signal to the decoder 50.

The reference voltage group generation part 90 receives reference power supply voltages VGH and VGL, divides the voltage between the reference power supply voltages VGH and VGL by resistor division, for example, to generate a reference voltage group (Vg0 to VgR) having different voltage values, and supplies the same to each decoder 50. The decoder 50 selects two reference voltages (Vgx, Vgy) from the reference voltage group described above based on the high voltage digital data signal supplied from the level shifter 60, and supplies input voltages V1 to V$2^K$ to which one or the other of the two selected reference voltages is assigned to the differential amplifier 10.

Based on the input voltages V1 to V$2^K$, each differential amplifier 10 outputs one of the voltage levels, which are obtained by dividing the voltage between the reference voltages Vgx and Vgy into a power of 2, as the output voltage signal Vout.

Here, each of the differential amplifiers 10 shown in FIG. 12 is formed by, for example, omitting the tail current control circuit 14A, 14B, or 14C from the configuration of the differential amplifier 10_1, 10_2, or 10_3 shown in FIG. 1, FIG. 4, or FIG. 9. For example, each of the differential amplifiers 10 shown in FIG. 12 is formed by omitting the tail current control circuit 14C that operates at a low voltage from the differential amplifier 10_3 shown in FIG. 9. At this time, a circuit corresponding to the tail current control circuit 14C is included in the tail current control circuit 14 shown in FIG. 12.

The low voltage bias circuit 140 supplies a low bias voltage to the tail current control circuit 14. Further, the high voltage bias circuit 150 supplies a high bias voltage that controls the operation of the differential amplifier. A bias voltage to be supplied to the clamp transistor included in the differential amplifier is also supplied from the high voltage bias circuit 150.

Figure 13:
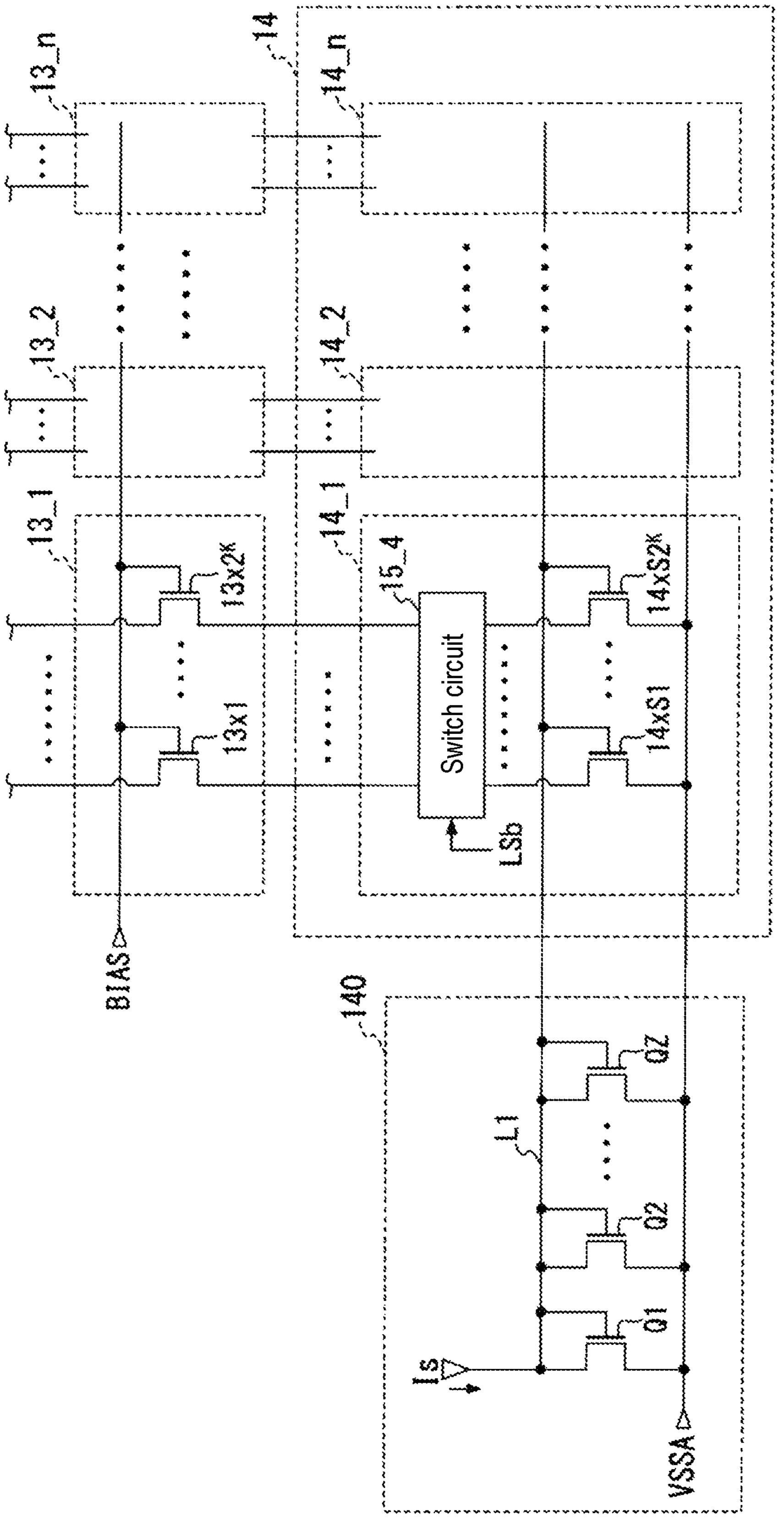
FIG. 13 is a circuit diagram showing an example of the internal configurations of the tail current control circuit 14 and the low voltage bias circuit 140.

FIG. 13 is a circuit diagram showing an example of the internal configuration of the tail current control circuit 14 that uses the tail current control circuit 14C included in the differential amplifier 10_3 shown in FIG. 9, and the internal configuration of the low voltage bias circuit 140.

As shown in FIG. 13, the tail current control circuit 14 includes tail current controllers 14_1 to **14_*n* respectively corresponding to the first to $n^{th}$ output channels of the data driver 53**.

Besides, in order to clarify the relationship of connection with the tail current controllers 14_1 to **14_*n*, FIG. 13 also shows breakdown voltage protection circuits 13_1 to 13_*n*** respectively corresponding to the first to $n^{th}$ output channels.

Hereinafter, the internal configurations of the breakdown voltage protection circuit 13_1 and the tail current controller 14_1 corresponding to the first output channel will be described assuming that the differential amplifier 10 includes $2^K$ differential pairs.

The breakdown voltage protection circuit 13_1 includes N-channel type clamp transistors **13*x*1 to 13*x*2$^K$ whose drains are respectively connected to the $2^K$ differential pairs of the differential amplifier 10_3. A predetermined bias voltage BIAS related to the clamp voltage is supplied from the high voltage bias circuit 150 to the gate of each of the clamp transistors 13*x*1 to 13*x*2**$^K$.

The tail current controller 14_1 includes current source transistors **14*x*S1 to 14*x*S2$^K$, each of which generates a reference current Io, and a switch circuit 15_4. The switch circuit 15_4 connects the source of each of the clamp transistors 13*x*1 to 13*x*2$^K$ to the drain of each of the current source transistors 14*x*S1 to 14*x*S2**$^K$ based on the lower bit group LSb described above, thereby performing control to change the current ratio of the tail currents flowing through the differential pair.

The low voltage bias circuit 140 includes N-channel type transistors Q1 to QZ (Z is an integer of 2 or more), each of which is diode-connected. The source of each of the transistors Q1 to QZ is connected to the supply line of the reference power supply voltage VSSA (for example, 0 V). A source current Is is supplied to the drain and gate of each of the transistors Q1 to QZ via a line L1, and a bias voltage obtained by converting the current Is into a voltage is supplied to the tail current control circuit 14 via the line L1. The line L1 is connected, for example, to the gates of the transistors **14*x*S1 to 14*x*S2$^K$ of each of the tail current controllers 14_1 to 14_*n* corresponding to all output channels. Thus, a bias voltage having a predetermined voltage value is supplied to the gates of the transistors 14*x*S1 to 14*x*S2$^K$ of each of the tail current controllers 14_1 to 14_*n*** corresponding to all output channels.

Here, the source current Is needs to have a current value that can provide the bias voltage to the transistors **14*x*S1 to 14*x*S2$^K$ for all output channels. If multiple bias voltages having different voltage values are required, the bias circuit 140 as shown in FIG. 13** is provided for each type of bias voltage.

The transistors **14*x*S1 to 14*x*S2$^K$ that supply tail currents to a plurality of differential pairs of the differential amplifier for each channel are configured to apply a sufficiently small reference current Io. Therefore, in the low voltage bias circuit 140, the source current Is is received by Z low voltage transistors (Q1 to QZ) having a diode connection configuration, and the current of the current source transistors 14*x*S1 to 14*x*S2**$^K$ for each channel is generated at a current mirror ratio of 1/Z.

At this time, the number of transistors for bias voltage generation tends to increase due to an increase in the number of differential pairs of the differential amplifier and an increase in the types of bias voltages. Thus, configuring the current source transistor that supplies the tail current to each differential pair with a low potential voltage transistor not only significantly reduces the circuit area for devices, which are equipped with digital-to-analog converters including differential amplifiers with multi-channel configurations, such as data drivers, but also enhances the effect of reducing the area of the bias circuit that supplies the bias voltage to each current source transistor.

What is claimed is:

1. A digital-to-analog converter, configured to convert a low voltage digital data signal with a low voltage into a high voltage analog output voltage signal with a high voltage, the digital-to-analog converter comprising:

a reference voltage generation part configured to generate a plurality of reference voltages different from each other;

a level shifter configured to receive the low voltage digital data signal, and convert the low voltage digital data signal into a high voltage digital data signal with an increased signal amplitude;

a decoder configured to select two reference voltages with different voltage values from the plurality of reference voltages based on the high voltage digital data signal, and generate a plurality of input voltages each having one or the other of the two reference voltages; and a differential amplifier comprising a plurality of differential pairs connected in parallel, and configured to receive the plurality of input voltages at respective non-inverting input terminals of the plurality of differential pairs and receive the output voltage signal at respective inverting input terminals of the plurality of differential pairs to generate the output voltage signal having one of voltage levels obtained by dividing the two reference voltages into a power of 2, wherein the differential amplifier comprises:

a plurality of current sources configured to generate tail currents flowing through respective tails of the plurality of differential pairs; and a plurality of clamp transistors provided respectively between the respective tails of the plurality of differential pairs and the plurality of current sources, and configured to hold a voltage applied to each of the plurality of current sources at a voltage lower than the high voltage.

2. The digital-to-analog converter according to claim 1, wherein each of the plurality of current sources comprises a low voltage transistor having a lower breakdown voltage than the transistors forming the differential pair and the clamp transistors.

3. The digital-to-analog converter according to claim 2, wherein each of the plurality of clamp transistors is a transistor whose drain is connected to the tail of the differential pair, whose source is connected to the current source, and whose gate is supplied with a predetermined bias voltage.

4. The digital-to-analog converter according to claim 3, wherein each of the plurality of clamp transistors holds the voltage applied to each of the plurality of current sources at or below the low voltage.

5. The digital-to-analog converter according to claim 1, wherein each of the plurality of current sources is a variable current source in which a current ratio of the tail currents flowing through each of the differential pairs is variable based on a predetermined bit group of the low voltage digital data signal.

6. The digital-to-analog converter according to claim 5, wherein the plurality of current sources comprise:

a plurality of constant current source transistors each configured to generate a fixed current corresponding to a bias voltage received at a gate thereof; and a switch circuit configured to control current paths connecting the respective tails of the plurality of differential pairs to the plurality of constant current source transistors by the predetermined bit group.

7. The digital-to-analog converter according to claim 1, wherein the differential amplifier comprises $2^K$ equivalent differential pairs (where K is an integer of 1 or more), in which a current ratio of the tail currents flowing through respective tails of the $2^K$ differential pairs is controlled to be constant, and generates the output voltage signal having one of voltage levels obtained by dividing the two reference voltages into $2^K$.

8. The digital-to-analog converter according to claim 1, wherein the differential amplifier comprises $2^K$ equivalent differential pairs (where K is an integer of 1 or more), in which a current ratio of tail currents flowing through respective tails of the $2^K$ differential pairs is controlled to be variable, and generates the output voltage signal having one of voltage levels obtained by dividing the two reference voltages into $2^M$ (where M is an integer greater than K).

9. A data driver, comprising a plurality of the digital-to-analog converters according to claim 1, the data driver being configured to receive each of video digital data signals, which represent a brightness level of each pixel as a digital value, as the low voltage digital data signal; convert each of the video digital data signals into a plurality of the output voltage signals each having an analog voltage value by the plurality of digital-to-analog converters; and supply the output voltage signals to a plurality of data lines of a display panel.

10. The data driver according to claim 9, comprising:

a shift register configured to generate a plurality of latch timing signals with different timings in synchronization with a clock signal;

a data register latch configured to capture each of the video digital data signals at the timings of the plurality of latch timing signals; and a high voltage level shifter configured to generate a plurality of the high voltage digital data signals by applying a level shifting process to each of the video digital data signals captured by the data register latch to increase amplitude, wherein the high voltage level shifter, the decoder, the differential pairs, and the plurality of clamp transistors comprise high voltage circuits, and the shift register, the data register latch, and the plurality of current sources comprise low voltage circuits that operate at a lower power supply voltage than the high voltage circuits.

11. A display device, comprising:

a display panel comprising a plurality of data lines respectively connected to a plurality of display cells; and a data driver configured to receive each of video digital data signals, which represent a brightness level of each pixel as a digital value, as the low voltage digital data signal, convert each of the video digital data signals into a plurality of the output voltage signals each having an analog voltage value by the digital-to-analog converter according to claim 1, and supply the output voltage signals to the plurality of data lines of the display panel.

* * * * *